US007131027B2

(12) United States Patent
Kodama et al.

(10) Patent No.: US 7,131,027 B2
(45) Date of Patent: Oct. 31, 2006

(54) METHOD AND APPARATUS FOR DISK ARRAY BASED I/O ROUTING AND MULTI-LAYERED EXTERNAL STORAGE LINKAGE

(75) Inventors: Shoji Kodama, San Jose, CA (US); Akira Yamamoto, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 204 days.

(21) Appl. No.: 10/886,651

(22) Filed: Jul. 9, 2004

(65) Prior Publication Data
US 2006/0010341 A1   Jan. 12, 2006

(51) Int. Cl.
G06F 11/00 (2006.01)
(52) U.S. Cl. .................. 714/6; 714/5; 714/7; 714/8; 711/114
(58) Field of Classification Search ............. 714/5–8; 711/114
See application file for complete search history.

(56) References Cited

U.S. PATENT DOCUMENTS

| | | | |
|---|---|---|---|
| 5,129,088 | A | 7/1992 | Auslander et al. |
| 5,819,310 | A | 10/1998 | Vishlitzky et al. |
| 6,216,202 | B1 | 4/2001 | D'Errico |
| 6,647,461 | B1 * | 11/2003 | Fujimoto et al. ............ 711/114 |
| 6,732,104 | B1 * | 5/2004 | Weber .......................... 707/10 |
| 6,983,303 | B1 * | 1/2006 | Pellegrino et al. ........... 709/203 |
| 2003/0115218 | A1 | 6/2003 | Bobbitt et al. |
| 2003/0126132 | A1 * | 7/2003 | Kavuri et al. ................ 707/10 |
| 2003/0126327 | A1 * | 7/2003 | Pesola et al. ................ 710/74 |
| 2003/0145045 | A1 | 7/2003 | Pellegrino et al. |
| 2004/0068561 | A1 * | 4/2004 | Yamamoto et al. .......... 709/224 |

OTHER PUBLICATIONS

Cisco MDS 9000 Family Fabric Manager User Guide, Release 1.1(1a)(Updated Sep. 25, 2003), "Managing VSANs", pp. 4-1-4-8.
SNIA Spring 2004 Tutorials, Storage Virtualization Tutorial-Abstract, http://www.snia.org/education/tutorials/spr2004/virtualization, Spring 2004.

* cited by examiner

Primary Examiner—Scott Baderman
Assistant Examiner—Timothy M. Bonura
(74) Attorney, Agent, or Firm—Mattingly, Stanger, Malur & Brundidge, P.C.

(57) ABSTRACT

A system and method for linking external storage systems that includes creating a virtual volume mapping at one or more storage systems. Each virtual volume mapping at each storage system associating a virtual storage volume with a physical storage volume and/or one second virtual storage volume at one or more second storage systems. An access request is received at a first storage system specifying a virtual volume. It is determined on which storage system a physical storage volume associated with the specified virtual volume in the access request is located using the virtual volume mapping at the first storage system and/or the virtual volume mapping at one or more second storage systems. Access is provided to the physical storage volume based on which storage system the physical storage volume is located. Useful in Storage Area Networks and many configurations including 1 to 1, dual path, mirrored, and concatenated, etc.

13 Claims, 27 Drawing Sheets

| Virtual Volume | Storage System | Next Volume | I/F | Cache | Mapping |
|---|---|---|---|---|---|
| VVol1 | SS_A | PVol10 | N/A | Yes | Internal |
| VVol2 | SS_B | VVol11 | IF1 | Yes | 1 to 1 |
| VVol3 | SS_C | VVol12 | IF2 | No | 1 to 1 |
| VVol4 | SS_D | VVol13 | IF3 | No | Dual Path1 |
|  | SS_E | VVol14 | IF4 | No | Dual Path2 |
| VVol5 | SS_F | VVol15 | IF5 | Yes | Mirrored |
|  | SS_G | VVol16 | IF6 | Yes | Mirrored |
| VVol6 | SS_H | VVol17 | IF7 | Yes | Concatenated |
|  | SS_I | VVol18 | IF8 | Yes | Concatenated |

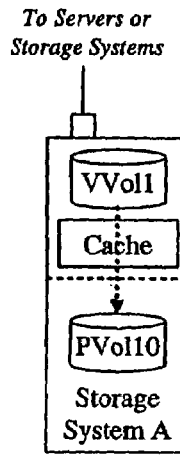
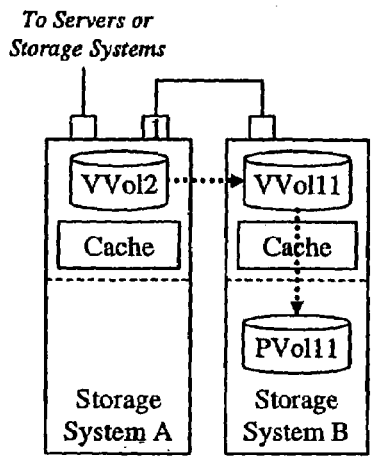
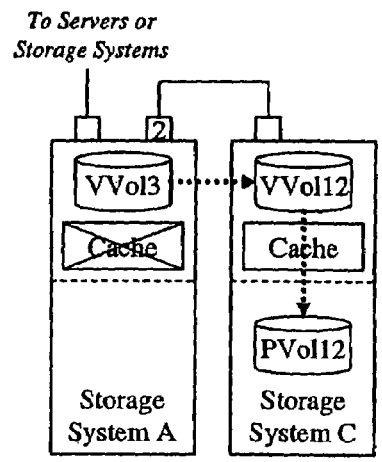
FIG. 4A     FIG. 4B     FIG. 4C
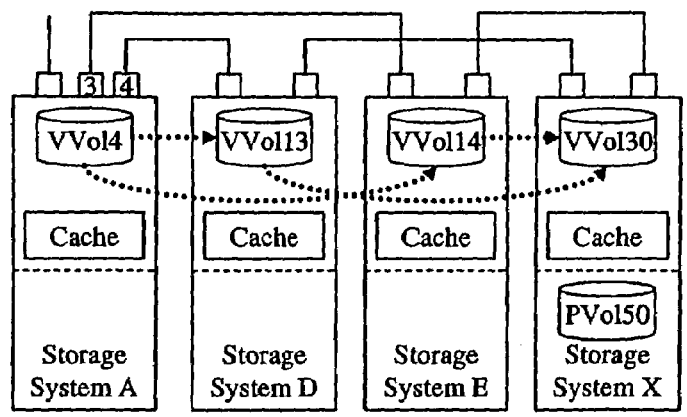
FIG. 4D

0713
Cached & Non-Cached Mixed Configuration

| | | |
|---|---|---|
| SS_A | VVol1 | Server1 |
| | VVol2 | Server1 |
| | VVol3 | Server2 |
| SS_B | VVol4 | Server3 |
| | VVol5 | Server1 |
| SS_C | VVol6 | Server3 |

*Result of Get_Devide_Info Request*

| Identification of Volume | V1 | | |
|---|---|---|---|
| Stored Storage System | SS_A | | |
| Assigned Interface | IF1 | | |
| Cache-able | Yes | | |
| Status | Working | | |
| Size | 100GBytes | | |
| Block Size | 512Bytes | | |
| Created | 7/1/1973 | | |
| Manufacture | Hitachi Data Systems | | |
| Mapping Type | Mirrored | Primary Next Storage System | SS_B |
| | | Status of Primary | Working |
| | | Primary Next Virtual Volume | V2 |
| | | External Interface to Primary | IF2 |
| | | Status of Interface to Primary | Working |
| | | Secondary Next Storage System | SS_C |
| | | Status of Secondary | Working |
| | | Secondary Next Virtual Volume | V3 |
| | | External Interface to Secondary | IF2 |
| | | Status of Interface to Secondary | Working |
| Identification of Volume | V2 | | |
| Stored Storage System | SS_B | | |
| Assigned Interface | IF3 | | |
| Cache-able | No | | |
| Status | Working | | |
| Size | 100Gbytes | | |
| Block Size | 512Bytes | | |
| Created | 7/1/1973 | | |
| Manufacture | Hitachi Data Systems | | |
| Mapping Type | Concatenated | Next Storage System 1 | SS_D |
| | | Status of SS1 | Unknown |
| | | Next Virtual Volume 1 | V5 |
| | | External Interface to SS1 | IF4 |
| | | Status of Interface to SS1 | No |
| | | Next Storage System 2 | SS_E |
| | | Status of SS2 | Working |
| | | Next Virtual Volume 2 | V6 |
| | | External Interface to SS2 | IF4 |
| | | Status of Interface to SS2 | Working |

FIG. 25A

| | | | |
|---|---|---|---|
| Identification of Volume | V3 | | |
| Stored Storage System | SS_C | | |
| Assigned Interface | IF7 | | |
| Cache-able | Yes | | |
| Status | Working | | |
| Size | 100Gbytes | | |
| Block Size | 512Bytes | | |
| Created | 7/1/1973 | | |
| Manufacture | Hitachi Data Systems | | |
| Mapping Type | Internal | Real Volume | P4 |
| | | Status of Real Volume | No |
| Identification of Volume | V5 | | |
| Stored Storage System | SS_D | | |
| Assigned Interface | Unknown | | |
| Cache-able | Unknown | | |
| Status | Unknown | | |
| Size | Unknown | | |
| Block Size | Unknown | | |
| Created | Unknown | | |
| Manufacture | Unknown | | |
| Mapping Type | Unknown | | |
| Identification of Volume | V6 | | |
| Stored Storage System | SS_E | | |
| Assigned Interface | IF9 | | |
| Cache-able | Yes | | |
| Status | Working | | |
| Size | 50Gbytes | | |
| Block Size | 512Bytes | | |
| Created | 7/1/1973 | | |
| Manufacture | Hitachi Data Systems | | |
| Mapping Type | Internal | Real Volume | P8 |
| | | Status of Real Volume | Working |

FIG. 25B

| Identification of Volume | P4 | | |
|---|---|---|---|
| Stored Storage System | SS_C | | |
| Assigned Interface | N/A | | |
| Cache-able | N/A | | |
| Status | No | | |
| Size | Unknown | | |
| Block Size | Unknown | | |
| Created | Unknown | | |
| Manufacture | Unknown | | |
| Protection | Unknown | | |
| RAID Group | Unknown | | |
| Identification of Volume | P8 | | |
| Stored Storage System | SS_E | | |
| Assigned Interface | IF9 | | |
| Cache-able | Yes | | |
| Status | Working | | |
| Size | 50Gbytes | | |
| Block Size | 512Bytes | | |
| Created | 7/1/1973 | | |
| Manufacture | Hitachi Data Systems | | |
| Protection | RAID5 (4D+1P) | | |
| RAID Group | RG23 | | |

FIG. 25C

METHOD AND APPARATUS FOR DISK ARRAY BASED I/O ROUTING AND MULTI-LAYERED EXTERNAL STORAGE LINKAGE

BACKGROUND

1. Field of the Invention

This invention relates to storage systems, and more specifically to routing of I/O requests to an appropriate storage system via virtual storage volume mapping in Storage Area Network (SAN) systems.

2. Description of the Related Art

Storage area networks (SANs) provide a solution for storing and retrieving mass amounts of data. A typical SAN network architecture may consist of one or more host devices interconnected to one or more network devices or switches through an interface. The network devices or switches may then be interconnected to one or more data storage devices through a second network or interface. Many SAN architectures use Fibre Channel (FC) as the interface or network, however, Ethernet, Infiniband, Internet, and other networks/interfaces may also be used in a SAN architecture.

In an SAN system, there may be one or more physically separated and independent SANs. Physically separated and independent SANs may be desired because a user may want security for data access. For example, if a system consists of two physically separated and independent SANs, SAN_A and SAN_B, if a server in SAN_A has been hacked, the hacker cannot access the storage system in SAN_B because it is physically independent and separated from that of SAN_A. Moreover, a user may not want I/O loads from a server in SAN_A to affect the I/O performance of another server in SAN_B, therefore, desiring SAN_A and SAN_B to be physically separated and independent. If these servers shared one SAN architecture, performance degradation may occur.

However, in systems where security or Input/Output (I/O) performance is not as high a priority, physically separated and independent SANs may be problematic. Servers connected to one SAN (e.g., SAN_A) are not connected to another SAN (e.g., SAN_B) and therefore the servers from SAN_A cannot access any storage systems associated and connected to SAN_B. This is problematic in that sometimes there may be a requirement that the servers in SAN_A have access to storage systems in SAN_B, and vice versa.

Some current SAN systems replicate data from a first storage system to a second storage system via a network, however, a server from one storage system cannot access data including the replicated data in the second storage system. In some other current systems, a virtual SAN (VSAN) is created that separates a physical SAN into multiple logical SANs. Data access from a server that is connected to one VSAN to a storage system that is connected to another VSAN is restricted. I/O loads in one VSAN can be isolated from other VSANs so there is no performance degradation among different VSANs. Thus, because of these capabilities, a user has a choice to create one large physical SAN and connect all of servers and storage systems to the physical SAN, and then separate the physical SAN into multiple VSANs. However, this is problematic in that even if a user has physical SANs in different locations, VSAN requires a user to connect these physical SANs to one big physical SAN. Thus, switches that have the VSAN function need to communicate with each other to keep consistent information of the VSAN configuration. Further, such communications over long distance introduces performance degradation of the system because such communications are slow. Another problem exists in that the VSAN is aware of a Fibre Channel protocol but is not aware of higher layers like Small Computer System Interface (SCSI). VSAN controls which server can access which storage system, but it does not control which server can access which volume in a storage system. Further, a user may want to restrict data access from a server at a SCSI layer, meaning volume level, because it provides more flexibility and granularity, but this is not possible.

Moreover, in other current systems, storage virtualization appliance sits between hosts and storage systems and provides virtualized volumes for the host. Similar to the VSAN, if a host needs to access data in a different SAN, the virtualization appliance must be able to access a SAN in which the host exists and the other SAN. As a result, this requires a large physically connected network. However, a storage virtualization appliance cannot be used by cascading two or more appliances because there is no way to selecting which data can be cached at which appliances or to diagnose in which appliances failures have occurred in the cascaded environment. Also, such appliances are not storage systems that have disk controllers, cache memory, physical storage in which data is stored, etc.

Therefore, there is a need for providing access to servers in one SAN to the storage devices in other physically separated and independent SANs.

SUMMARY OF THE INVENTION

A system and method for linking external storage systems that includes creating a virtual volume mapping at one or more storage systems. Each virtual volume mapping at each storage system associating a virtual storage volume with a physical storage volume and/or one second virtual storage volume at one or more second storage systems. An access request is received at a first storage system specifying a virtual volume. It is determined on which storage system a physical storage volume associated with the specified virtual volume in the access request is located using the virtual volume mapping at the first storage system and/or the virtual volume mapping at one or more second storage systems. Access is provided to the physical storage volume based on which storage system the physical storage volume is located. Useful in Storage Area Networks and for many storage configurations including 1 to 1, dual path, mirrored, and concatenated, etc.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIGS. 4A–G are diagrams of mapping configurations according to example embodiments of the present invention;

FIGS. 25A–C are example results of a get device info request according to an example embodiment of the present invention.

DETAILED DESCRIPTION

Figure 1:
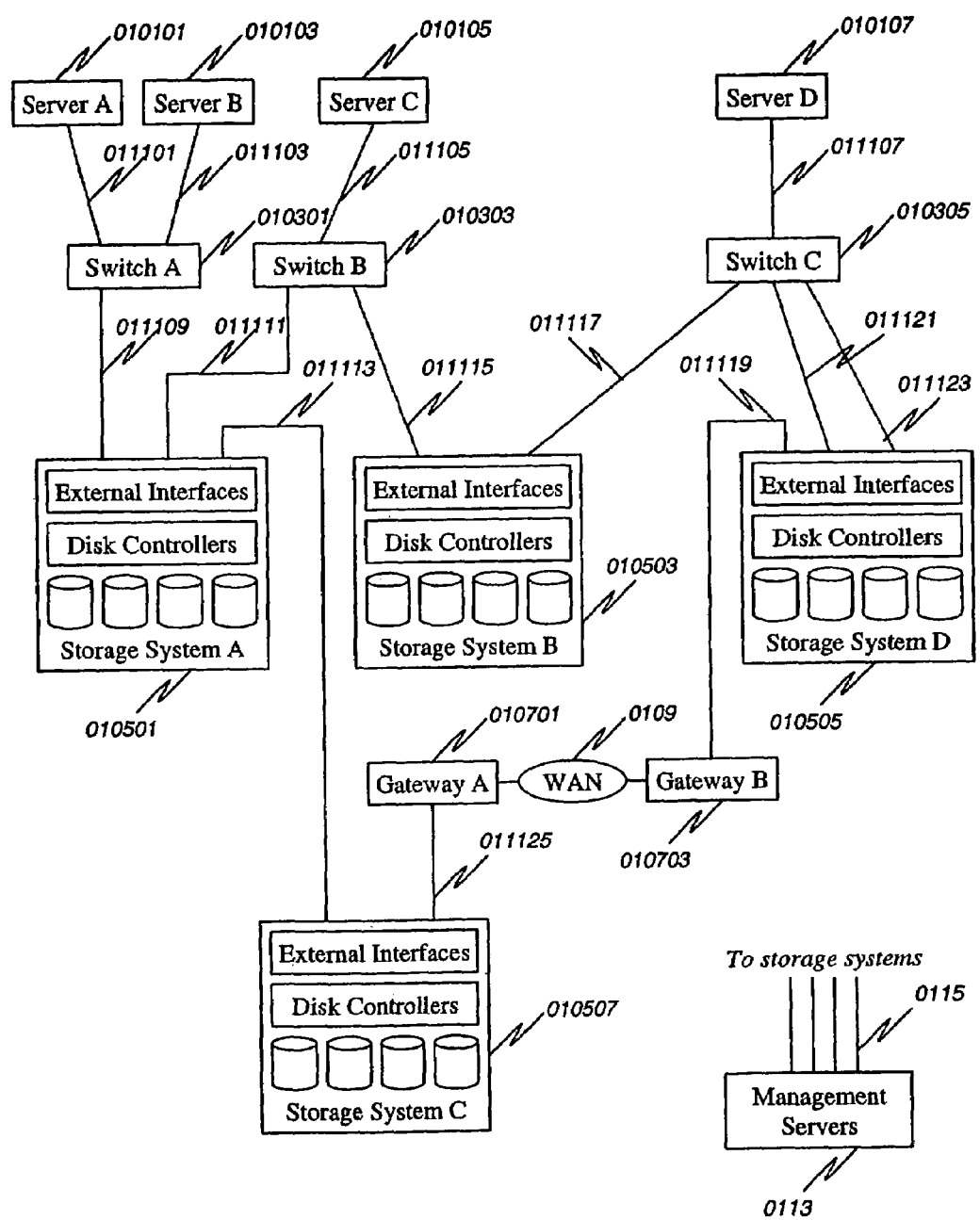
FIG. 1 is a diagram of a system for linking external storage systems according to an example embodiment of the present invention.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Embodiments of the present invention relate to systems and methods that allow a server in one SAN to access storage devices in another physically separated and independent SAN. An I/O request from a server is transferred from one storage system to another storage system and finally processed by the end storage system. Data can be cached at one or more intermediate storage systems. This is selectable for each virtual volume at each storage system. Each storage system may provide a virtual volume and the virtual volume may be mapped to a different virtual volume in an external storage system. Eventually, these mappings may be terminated at a real volume where data is to be stored or retrieved.

Each storage system may provide information about how I/O is routed. For example, a parent storage system may ask a child storage system about virtual volume information and send the information to a grandparent storage system with information about the parent storage system. The information may include communication latency between storage systems. Error or failure information may go up from the end storage system to the first storage system. Which server or storage system can access which virtual volume can be controlled. An intermediate storage system does not need to have any real volumes or physical storage media, but may simply contain mapping information that maps I/O requests received from one storage system to another storage system.

FIG. 1 shows a diagram of a system for linking external storage systems according to an example embodiment of the present invention. The system includes multiple SAN configurations. Various servers, 010101, 010103, 010105, 010107 are connected to one or more switches, 010301, 010303, 010305 that interconnect the servers to one or more storage systems, 010501, 010503, 010505, 010507. The servers, switches and storage systems are interconnected via several interfaces, 011101–011125. Two or more SANs may also be interconnected via one or more gateways, 010701,

010703 and/or one or more wide area networks (WAN), 0109. A gateway may be located at each location and may transfer data between remote locations via a WAN. A WAN may be a long distance network that connects multiple geographically distributed locations where SANs exist and provide data communication among them (e.g., Internet).

One or more management servers, 0113, may also be provided in the system to allow a user a way to manage the storage systems. Management may include configuration of storage systems, monitoring availability of storage systems, showing current configuration and monitored information of storage systems on a graphical user interface, etc. Management servers may communicate with one or more storage systems via networks, 0115.

A server may consist of processors, memories, internal disk drives, etc. An operating system and applications may be running on each server where the operating system and applications read and write data on volumes in the storage systems via networks. Each server may have a host bus adapter (HBA) (not shown) to connect to a switch.

The switches, 010301, 010303, 010305, connect servers and storage systems and transfers data between them. They also may transfer data between storage systems. A Fibre Channel switch, Ethernet switch, Infiniband switch, or any other switch may be used for this purpose. Servers may be connected to storage systems directly without any switch between them, and further it may be possible that two or more switches are cascaded.

The storage systems, 010501, 010503, 010505, 010507, may store application data in its volumes. A storage system may also communicate with other storage systems via networks, and read and write data into the external storage systems. This will be discussed in more detail later.

The interfaces or cables, 011101–011125, may connect a server to a switch, a server to a storage system, a storage system to a switch, a storage system to another storage system, etc. Servers and storage systems are generally connected to switches, however, two storage systems may be connected directly (see storage system A, 010501 connected via interface 011113 to storage system C, 010507). Moreover, as shown in this example system embodiment, two storage systems may be connected over a WAN. In this example embodiment, server A, 010101, and server B, 010103, cannot access storage system B, 010503, storage system C, 010507, or storage system D, 010505, via switches, however, according to the present invention, virtual volumes in each storage system may contain mapping information that allows server A and server B to access these storage systems.

Figures 2, 3:
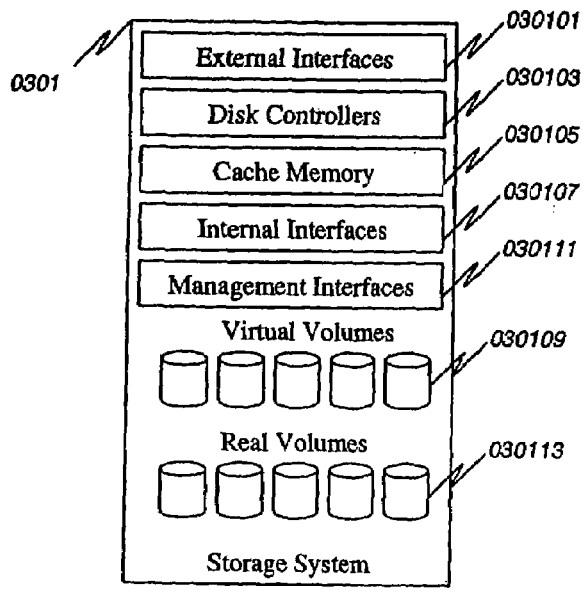
FIG. 2 is a diagram of a storage system according to an example embodiment of the present invention.
FIG. 3 is a diagram of a virtual volume mapping table according to an example embodiment of the present invention.

FIG. 2 shows a diagram of a storage system according to an example embodiment of the present invention. A storage system, 0301, may consist of one or more external interfaces, 030101, one or more disk controllers, 030103, one or more cache memories, 030105, one or more virtual volumes, 030109, and zero or more real volumes, 030113. Each of these components may be interconnected internally and communicate with each other. Servers, switches and external storage systems may be connected to a storage system via external interfaces, for example, a Fibre Channel interface, an Ethernet interface, an Infiniband interface, etc. Disk controllers, 030103, process I/O requests issued by servers and external storage systems.

The disk controller receives I/O requests from external interfaces. A disk controller may also process configuration change requests issued by a management server. The disk controller receives configuration change requests from management interfaces and/or external interfaces. Moreover, a disk controller may issue I/O requests to external storage systems via external interfaces, manage virtual volumes and real volumes inside a storage system, read and write data in real volumes inside of a storage system and virtual volumes outside of the storage system via external interfaces, and may store data on cache memories for faster data access.

A cache memory is a temporal memory for storing data for faster access. An internal interface may be connected to real volumes inside of a storage system and provide disk controllers that control access to data in the real volumes. A management interface may be connected to management servers. A disk controller may receive configuration change requests from a management interface, and may also use a management interface to send information to a management server.

A virtual volume is not a real storage in which data is stored. Data is stored in real volumes. A server sees virtual volumes in storage systems and sends I/O requests to the virtual volumes. The virtual volumes may appear as real volumes to the servers. A disk controller knows which virtual volume is mapped to which real volume inside the storage system or to which virtual volume outside of the storage system. A real volume stores data and may consist of one or more physical storage medium, for example, hard disk drive, flash memory, DVD media, etc. According to embodiments of the present invention, it is possible that a storage system does not have any real volumes in it, and therefore only provides virtual volumes to a server and uses external storage systems to store data.

According to embodiments of the present invention, a server can read and write data in a remote storage system although the server is not connected to the remote storage system because there is a route between the server and the storage system by passing through intermediate storage systems. For example, using FIG. 1, server A has a connection to storage system A. Storage system A has a connection to storage system B. Storage system B has a connection to storage system D. If server A issued I/O requests to storage system A, the I/O requests may reach to storage system D via intermediate storage systems and network connections. There can be two or more routes from one storage system to another storage system. For example, storage system A may access to storage system D by passing through storage system C, gateway A, and WAN and gateway B, also.

Each storage system may provide virtual volumes accessible by servers. Servers issue I/O requests to virtual volumes in a storage system, for example, a parent storage system, to which the servers are connected. A virtual volume is a logical representation of data storage and is not a real storage. A virtual volume may be mapped to an external virtual volume in an external storage system, for example, a next storage system, to which the parent storage system is connected, or a virtual volume may be mapped to a real volume inside the parent storage system. Further, according to embodiments of the present invention, there may be a hierarchy of virtual volumes among multiple different storage systems. I/O requests to a virtual volume of a parent storage system may be transferred to a real volume of an end storage system. It is possible that data may be cached in cache memories of intermediate storage systems, or possible to select if data can be cached or not at intermediate storage systems for each virtual volume. Further, there may be multiple ways to map one virtual volume in a storage system to one or more virtual volumes in a next storage system.

FIG. 3 shows a diagram of a virtual volume mapping table according to an example embodiment of the present invention. Each storage system may have its own virtual volume mapping table that manages virtual volumes that the storage system manages. Therefore, each storage system may have a different virtual volume mapping table. However, it is also possible that all storage systems have an identical virtual volume mapping table. A virtual volume mapping table may show how a virtual volume in a storage system is mapped to real volumes inside the storage system and/or is mapped to virtual volumes in next storage systems. A virtual volume mapping table according to the present invention may include information related to the virtual volume, 050101, the storage system, 050103, the next volume 050105, the interface (I/F), 050107, whether a cache exists, 050109, and a mapping configuration or type, 050111. The virtual volume information, 050101, may provide identifications of virtual volumes presented from a storage system. The storage system information, 050103, and next volume information, 050105, may provide identifications of volumes to which a virtual volume is mapped. A virtual volume of a next storage system may be specified by an identification of a next storage system in which a next virtual volume exists and an identification of the next virtual volume (for example, see volume 2). A virtual volume may be mapped to real volumes inside a storage system (for example, see virtual volume 1 (VVol1)). Further, it is possible that one virtual volume is mapped to two or more volumes (for example, see virtual volume 4 (VVol4)).

The I/F information, 050107, shows external interfaces of a storage system from which a next storage system is accessed. The Cache information, 050109, may specify if data is cached at a storage system or not. The Mapping information, 050111, may specify how a virtual volume is mapped to other volumes. A virtual volume may be mapped to other volumes in any of many different configurations, for example, internal mapping, one-to-one mapping, dual path mapping, mirrored mapping, concatenated mapping, RAID5 mapping, etc.

Figure 4E:
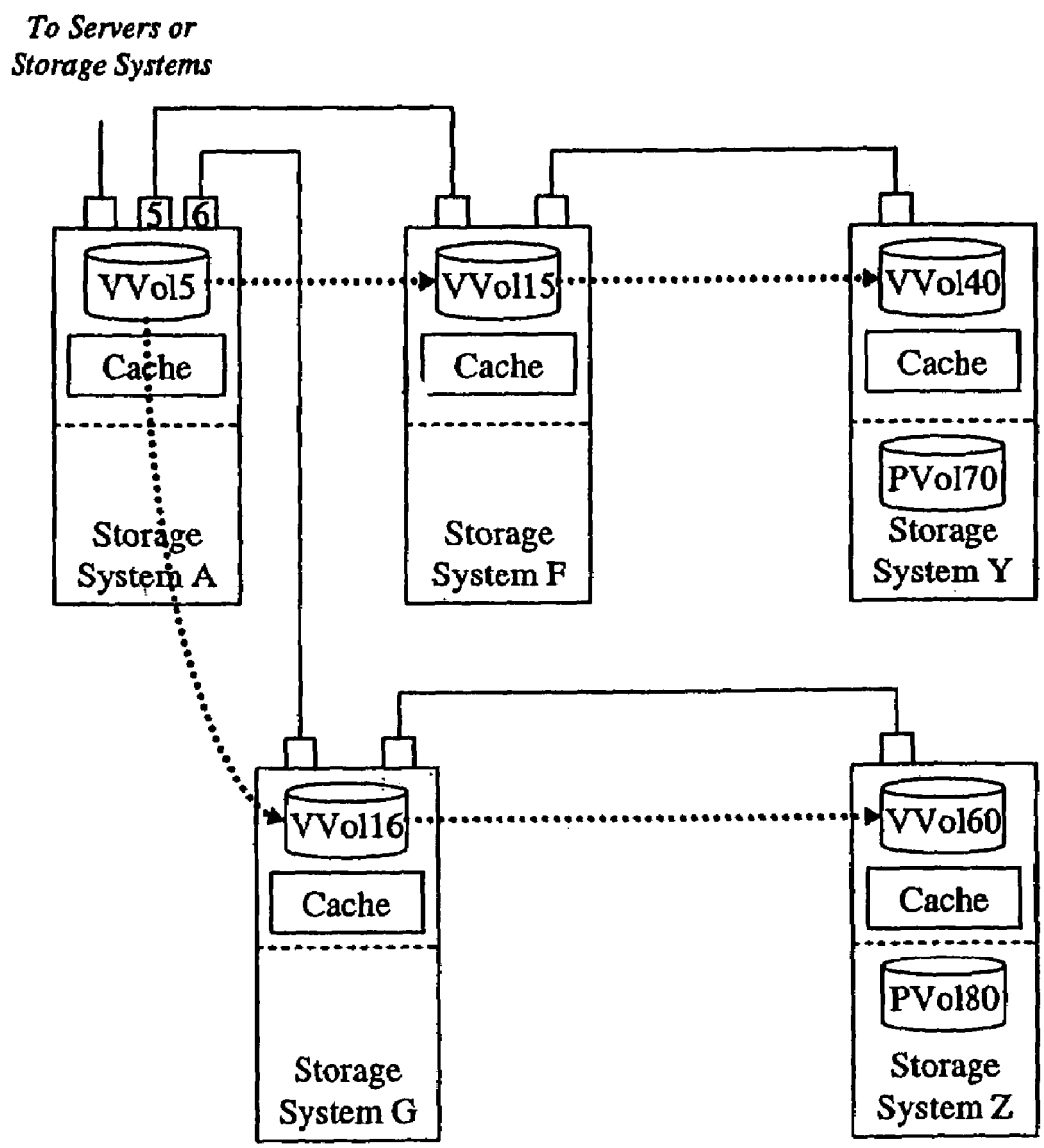

FIGS. 4A–G shows diagrams of mapping configurations according to example embodiments of the present invention. FIG. 4A shows a diagram of internal mapping where a virtual volume is mapped to a real volume inside a storage system. For example, virtual volume 1 (VVol1) in storage system A is mapped to physical volume 10 (PVol10) in storage system A. It may also be possible that one virtual volume is mapped to multiple real volumes inside a storage system.

FIGS. 4B and 4C show example one-to-one mappings, with cache and without cache, respectively, where one virtual volume is mapped to one virtual volume of a next storage system. For example, virtual volume 2 (VVol2) in storage system A is mapped to virtual volume 11 (VVol11) in storage system B. FIG. 4D shows an example of dual path mapping where a storage system may have two or more different routes to an end storage system. I/O requests are transferred via one of the routes, and whichever route the storage system has used to transfer the I/O requests, the transferred I/O requests are eventually received by the same end storage system which has a real volume in which data is finally read or written.

For example, virtual volume 4 (VVol4) is mapped to virtual volume 13 (VVol13) of storage system D and to virtual volume 14 (VVol14) of storage system E. Then, virtual volume 13 (VVol13) and virtual volume 14 (VVol14) are mapped to the same virtual volume 30 (VVol30) of storage system X. Virtual volume 30 (VVol30) is mapped to physical volume 50 (VVol50) of storage system X. Therefore, there may be one primary path and one or more secondary paths. A disk controller may select the primary path for transferring I/O requests initially, and if the primary path is not available because of link failures or next storage system failures, the disk controller may select one of the secondary paths and use it to transfer the I/O requests.

FIG. 4E shows an example mirrored mapping configuration where a virtual volume is mapped to two or more next virtual volumes. I/O requests may be transferred to all of the next virtual volumes. Virtual volume 5 (VVol5) in storage system A is mapped to virtual volume 15 (VVol15) in storage system F and virtual volume 16 (VVol16) in storage system G. Virtual volume 15 (VVol15) is mapped to virtual volume 40 (VVol40) and then to physical volume 70 (PVol70) in storage system Y. Virtual volume 16 (VVol16) is mapped to virtual volume 60 (VVol60) and then to physical volume 80 (PVol80) in storage system Z. Physical volume 70 (PVol70) and physical volume 80 (PVol80) may have identical data. A disk controller may transfer I/O requests to both next storage systems, storage system F and storage system G.

Figure 4F:
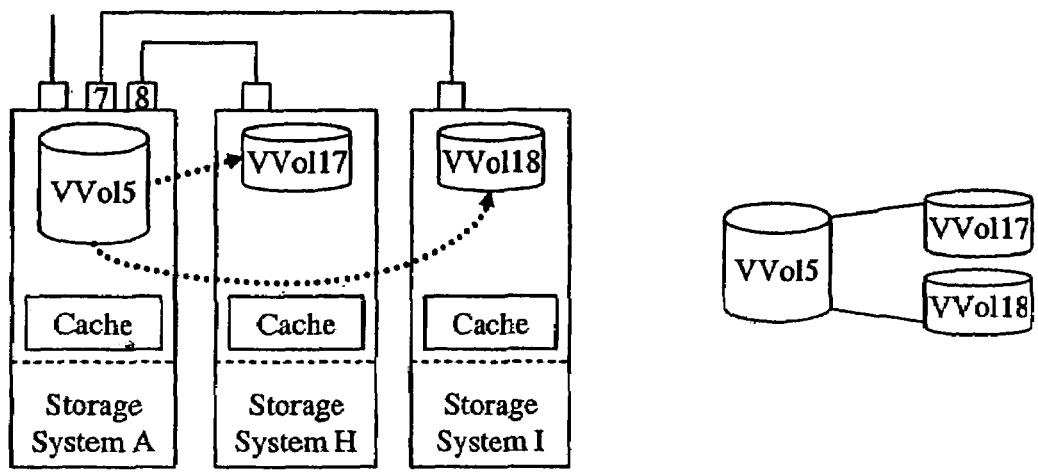

FIG. 4F shows an example concatenated mapping configuration where a virtual volume is divided into multiple regions and each region is mapped to a different virtual volume. The capacity size of a region may be the same as the capacity size of a mapped next virtual volume. As shown in this example embodiment, virtual volume 5 (VVol5) may be divided into two regions, one region may be mapped to virtual volume 17 (VVol17) in storage system H and the other region being mapped to virtual volume 18 (VVol18) in storage system 1.

Figure 4G:
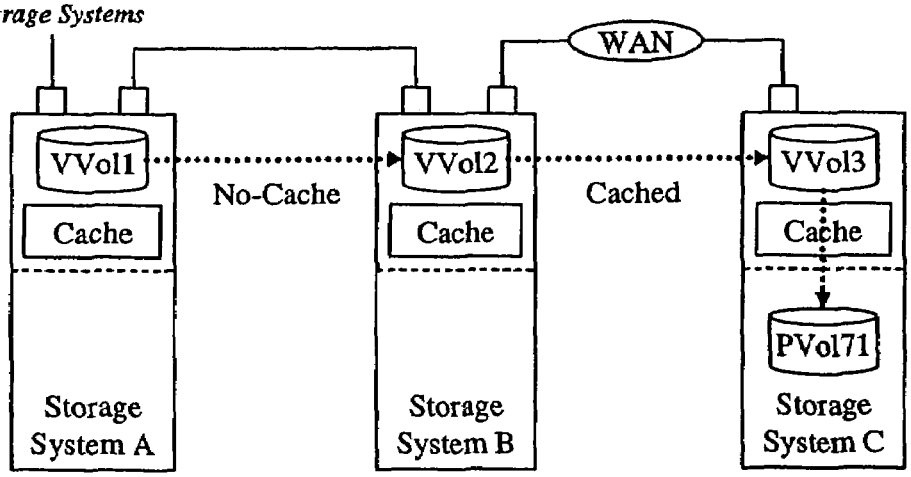

FIG. 4G shows an example cached and non-cached mixed configuration. According to embodiments of the present invention, it is possible to mix cache/non-cache configurations for one hierarchy of a sequence of virtual volumes. In this example embodiment, data in physical volume 71 (PVol71) at storage system C is not cached at storage system A but is cached at storage system B. Since data access via a WAN is slow, this configuration provides faster performance by caching data at the storage system B before data is transferred over a WAN to physical volume 71 (PVol71) at storage system C.

Therefore, according to embodiments of the present invention, a disk controller may transfer received I/O requests to a next storage system based on a virtual volume mapping table. Mapping may be any type of mapping configurations including, but not limited to, internal mapping, one-to-one mapping, dual path mapping, mirrored mapping, concatenated mapping, RAID5 mapping, etc.

Figure 5:
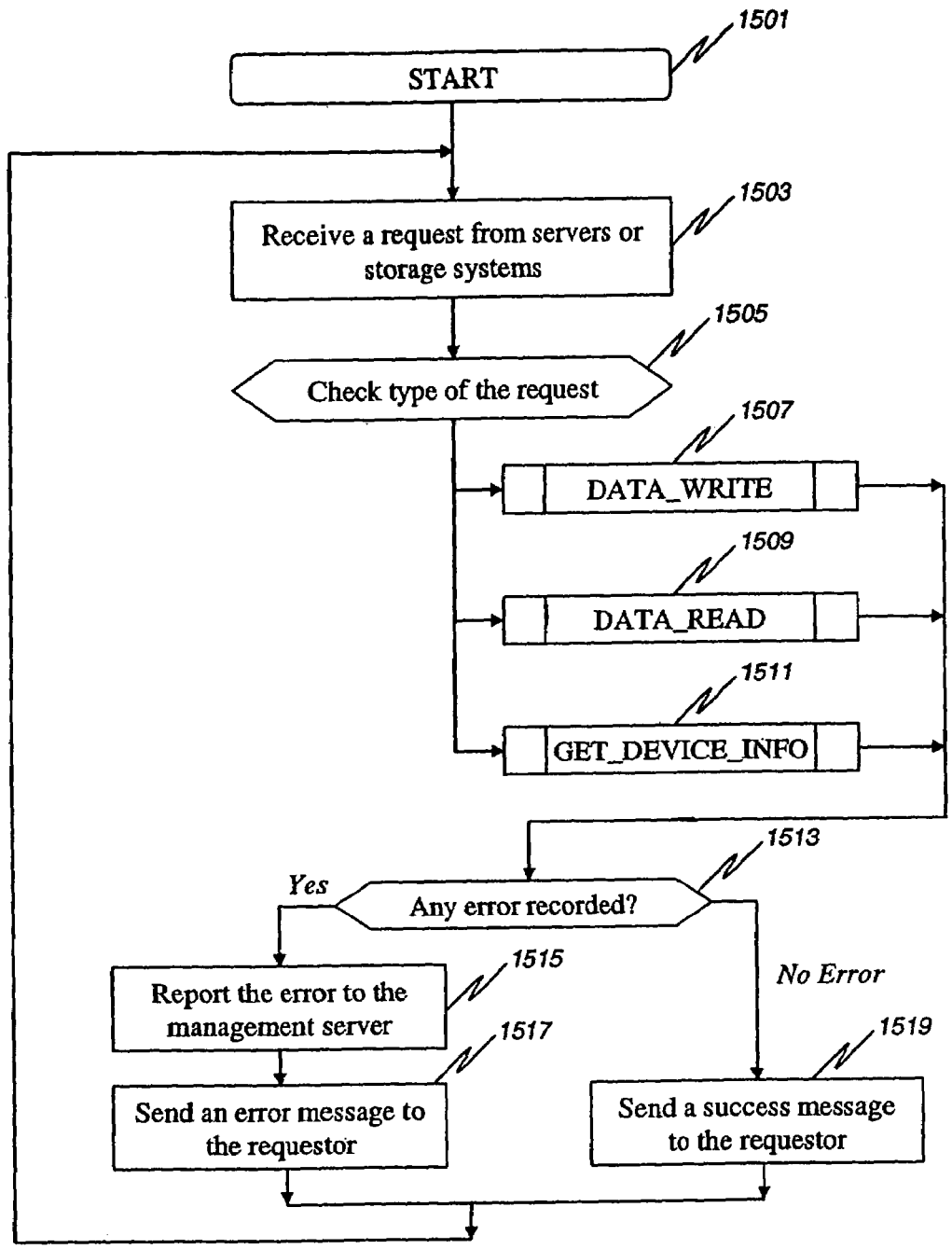
FIG. 5 is a flowchart of a disk controller main routine according to an example embodiment of the present invention.

FIG. 5 shows a flowchart of a disk controller main routine according to an example embodiment of the present invention. Once the routine is started, 1501, a disk controller of a storage system may wait for a request from a server or an external storage system, 1503. Once a disk controller receives a request, the disk controller checks the type of the request, 1505. The disk controller may then execute a process or subroutine based on the type of the request, for example, a data write subroutine, 1507 may be executed if the request is a write request, a data read subroutine, 1509, may be executed if the request is a read request, and a get device info subroutine, 1511, may be executed if the request is a get device information request. After completion of the executed subroutine, the disk controller may check if there were any errors recorded, 1513, since during subroutine execution, the subroutine may record any error that might have occurred. If there were any errors, the disk controller may report the error to a management server, 1515, and then send an error message to an originator of the request, 1517. If there were no errors, the disk controller may then send a "success" message to the requestor or originator of the request, 1519. This process may then be repeated. A disk controller may also process a configuration change request issued by a management server where, according to the request, the disk controller changes the internal configuration. The changes may include, for example, changing a virtual volume mapping table.

Figure 6:
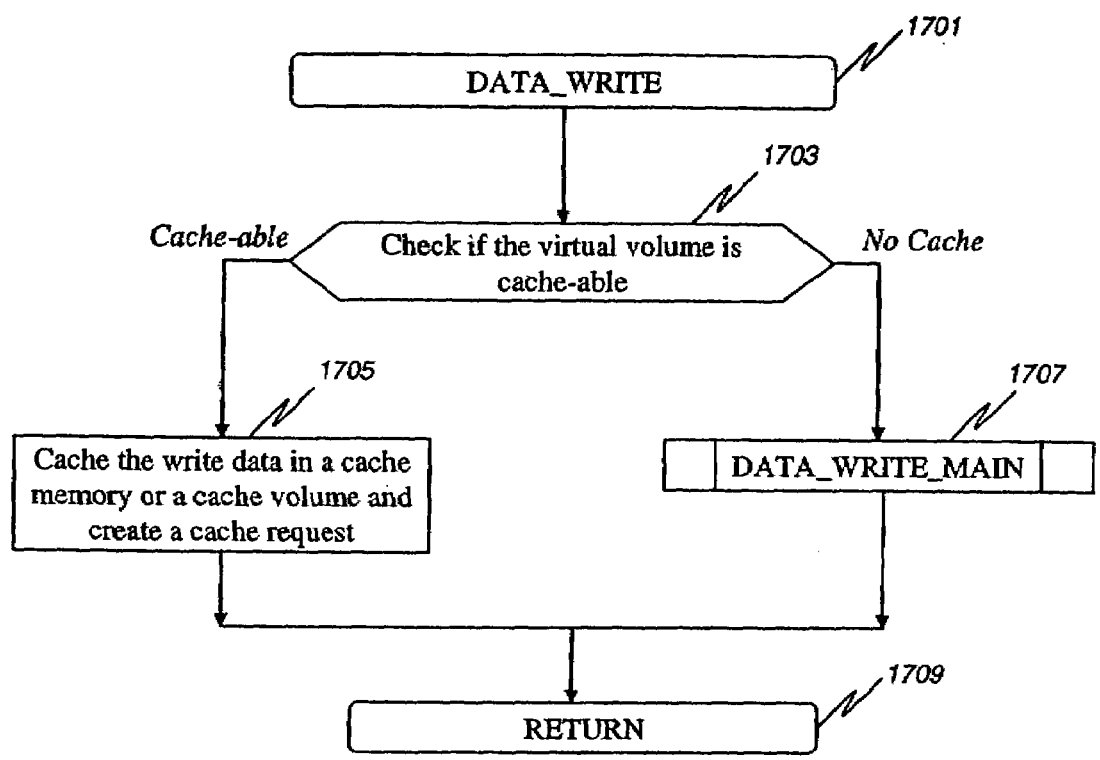
FIG. 6 is a flowchart of a data write process according to an example embodiment of the present invention.

FIG. 6 shows a flowchart of a data write process according to an example embodiment of the present invention. Once the data write process is called, 1701, the disk controller checks if a virtual volume to which the receiver request is issued is cache-able or not by checking a "cache" column of a virtual volume mapping table, 1703. If the virtual volume is cache-able, the disk controller may store data being attached to the received request into its cache memory or its cached volume if applicable, and then create a cache request and put the cache request into a cache request queue, 1705. A cache volume is a physical storage media in which data is stored and compared with a cache memory that is a volatile memory. The cache volume may be a non-volatile memory. If no space is available in cache memory, the disk controller may use cache volume to cache data. A cache request of information related to location of data in cache memory, a size of data, identification of virtual volume in which the I/O request was issued, and an offset in the virtual volume to which the data needs to be stored. If the virtual volume is not cache-able, a data write main subroutine, 1707, may be executed, after which, the data write subroutine 1701, is exited, 1709.

Figure 7:
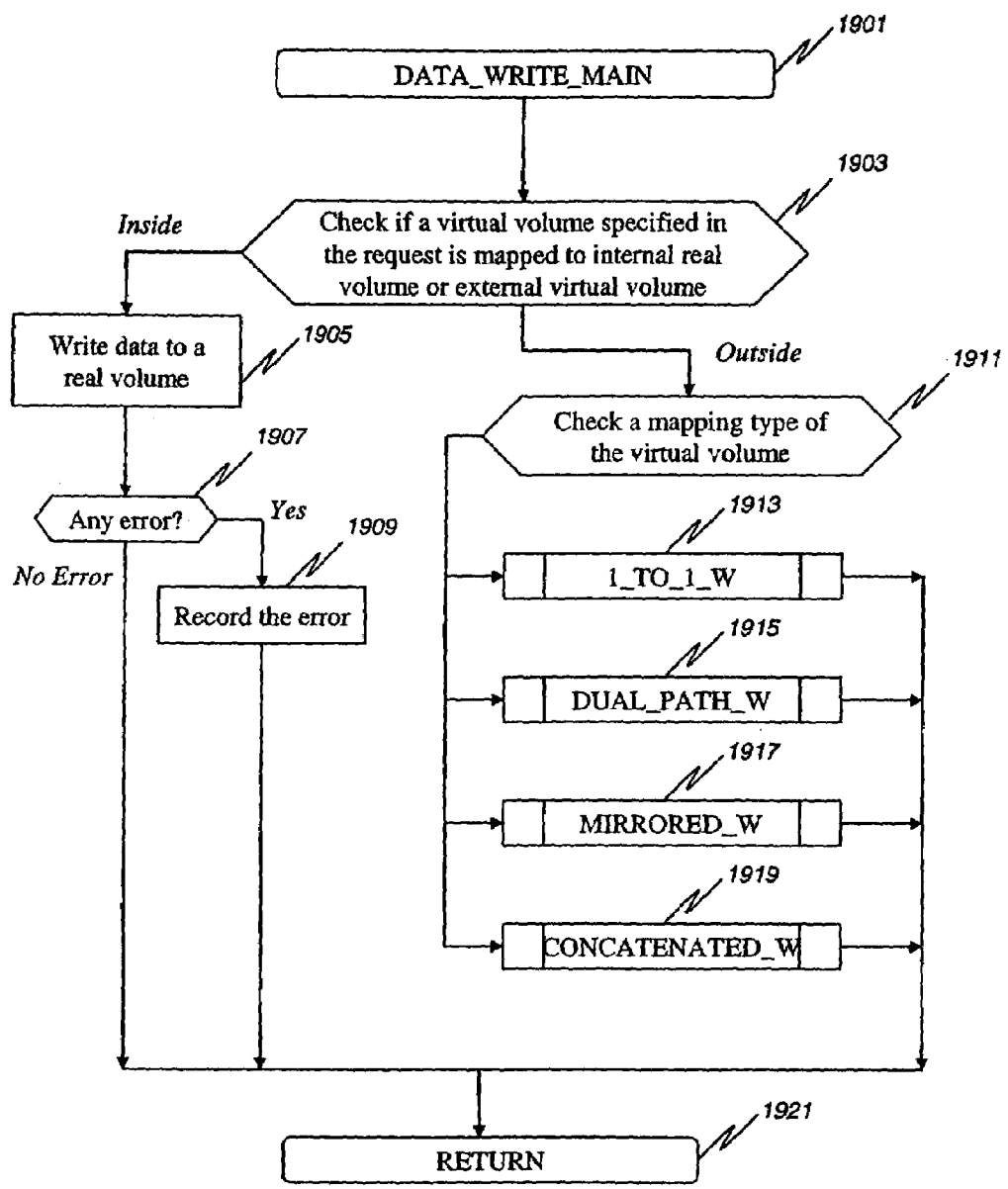
FIG. 7 is a flowchart of a data write main subprocess according to an example embodiment of the present invention.

FIG. 7 shows a flowchart of a data write main subprocess according to an example embodiment of the present invention. Once the data write main subprocess begins execution, 1901, the disk controller checks if a virtual volume specified by the received request is mapped to a real volume inside the storage system or mapped to an external virtual volume outside the storage system, 1903. The may occur by using a virtual volume mapping table. If the virtual volume specified in the request is mapped to an internal real volume, the disk controller writes data attached to the received request to a real volume that is mapped to the virtual volume, 1905. If any errors have occurred during the write data, 1905, 1907, the disk controller records the errors, 1909, into its memory. If the virtual volume specified in the request is mapped to an external virtual volume, the disk controller may check the mapping type or configuration of the virtual volume and the external virtual volumes 1911. Depending on the mapping type or configuration, a one-to-one write process, 1913, may be executed, a dual path write process, 1915, may be executed, a mirrored write process, 1917, may be executed, or a concatenated write process 1919, may be executed. After completion of the configuration process or completion of the writing of the data to a real volume, the data write main process ends, 1921.

Figure 8:
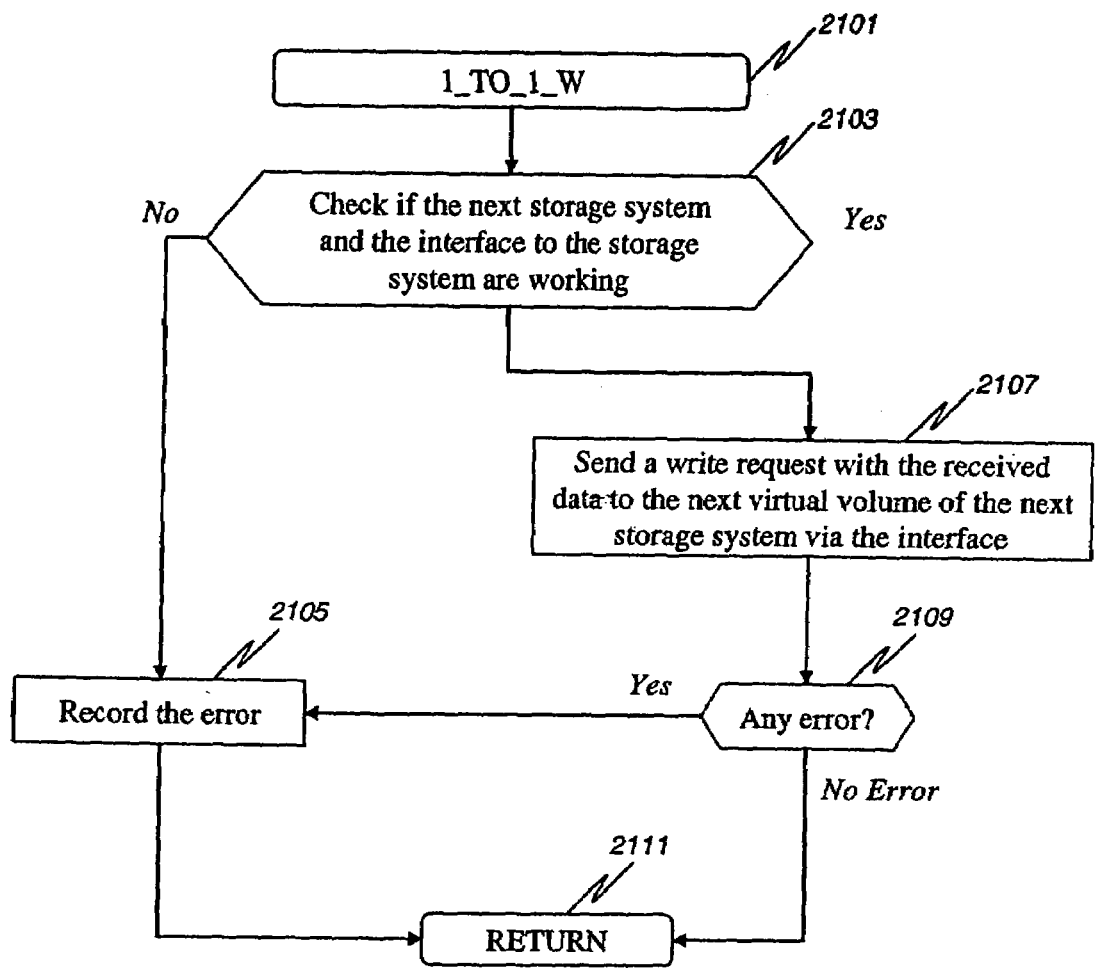
FIG. 8 is a flowchart of a one-to-one write process according to an example embodiment of the present invention.

FIG. 8 shows a flowchart of a one-to-one write process according to an example embodiment of the present invention. Once the process is called, 2101, a disk controller checks if the next storage system and the external interface from which the next storage is accessed are working or not, 2103. A virtual volume mapping table may show the next storage system and the external interface to use. Each disk controller may have a failure management table (discussed later) to help with this purpose. If at least one of them is not working, the disk controller may record the errors into its memory, 2105, and exit the process, 2111. If both are working, the disk controller may create a write request and send it to the next storage system via the external interface, 2107. The write request may be a modified version of the received request and may have a format that includes a request type, read or write, get device info, etc., an identification of a virtual volume, an offset in the virtual volume where data is written from the offset, a size of the data, and the data to be written. The disk controller may change only the identification of a virtual volume in the received request. The disk controller may create a new write request with an identification of a next virtual volume. The other entries in the new request may remain the same as the received request. If there were any errors during the sending of the write request, 2107 detected, 2109, the disk controller may record the errors into its memory, 2105. The disk controller may record the errors in a failure management table also. After the one-to-one write process has completed, the process is exited, 2111.

Figure 9:
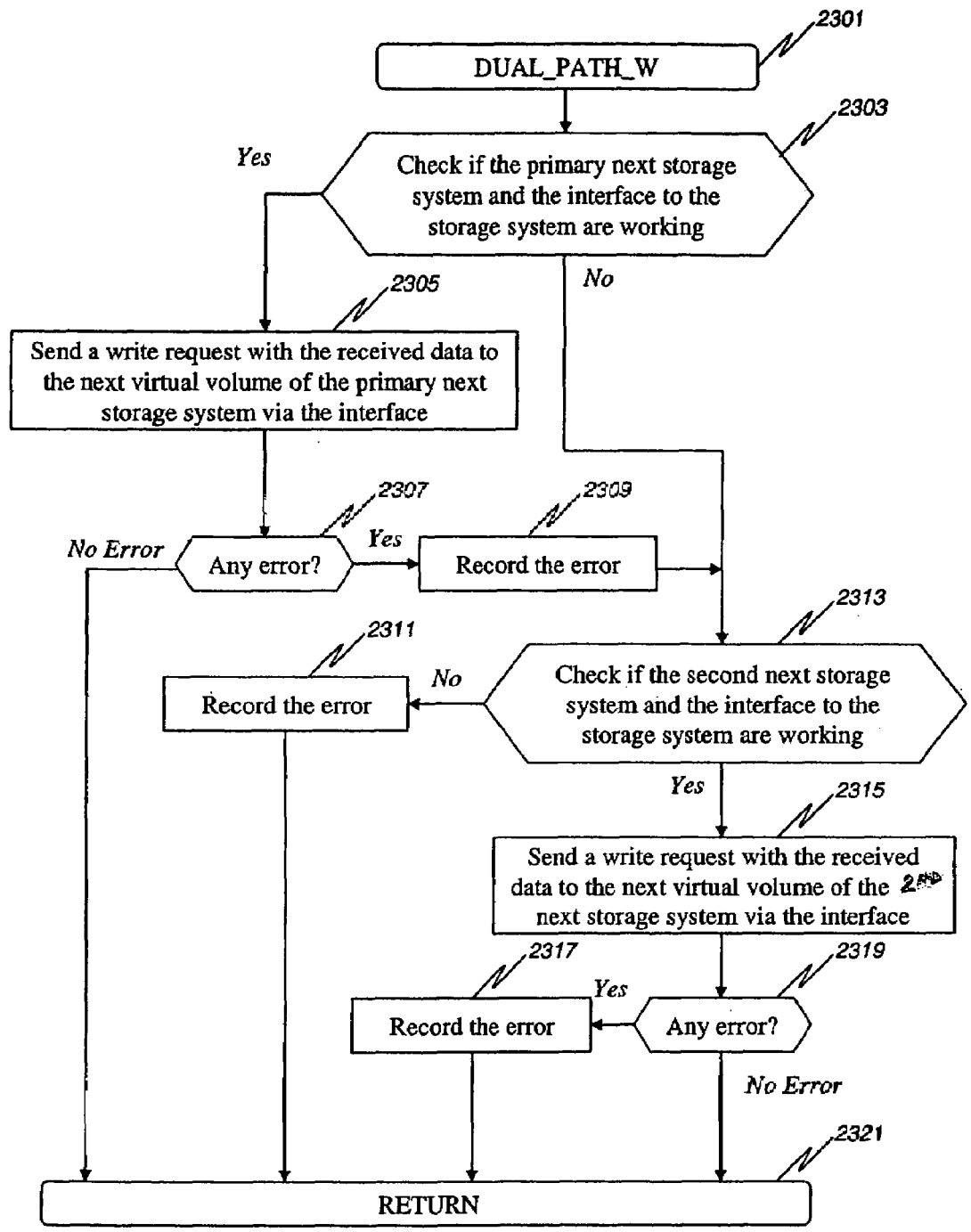
FIG. 9 is a dual path write process according to an example embodiment of the present invention.

FIG. 9 shows a dual path write process according to an example embodiment of the present invention. Once the process begins, 2301, the disk controller checks if the primary next storage and the external interface to the primary next storage are working, 2303. If they both are working, the disk controller may create a write request and send it to the next storage system via the external interface, 2305. If there were any errors during the sending of the write request, 2307, the disk controller records the errors into its memory and the failure management table, 2309, and proceeds to step 2313. If there were no errors during the sending of the write request, 2305, the disk controller exits this process 2321. If either the primary next storage system or the interface to the storage system is not working, or if any errors occurred during the sending of a write request, 2307, the disk controller may check if a second next storage system and the interface to the second storage system are working, 2313. If they are not working the disk controller may record the errors in its memory, 2311, and exit this process, 2321. If the second next storage and the interface to the storage system are working, the disk controller may create a write request and send it to the second next storage system via the interface, 2315. If there were any errors during the sending, 2315, 2319, the disk controller may record the errors into its memory and the failure management table, 2317, and then exit the process, 2321. If the primary storage system was not working but sending I/O requests to the second storage system was successful, the disk controller may not send an error response to the requester in the disk controller main routine. The disk controller may send the error in the primary storage system only to a management server. If there were no errors detected during a sending of a write request to the second next storage system, 2315, the data write was successful and the disk controller exits this process, 2321.

Figure 10:
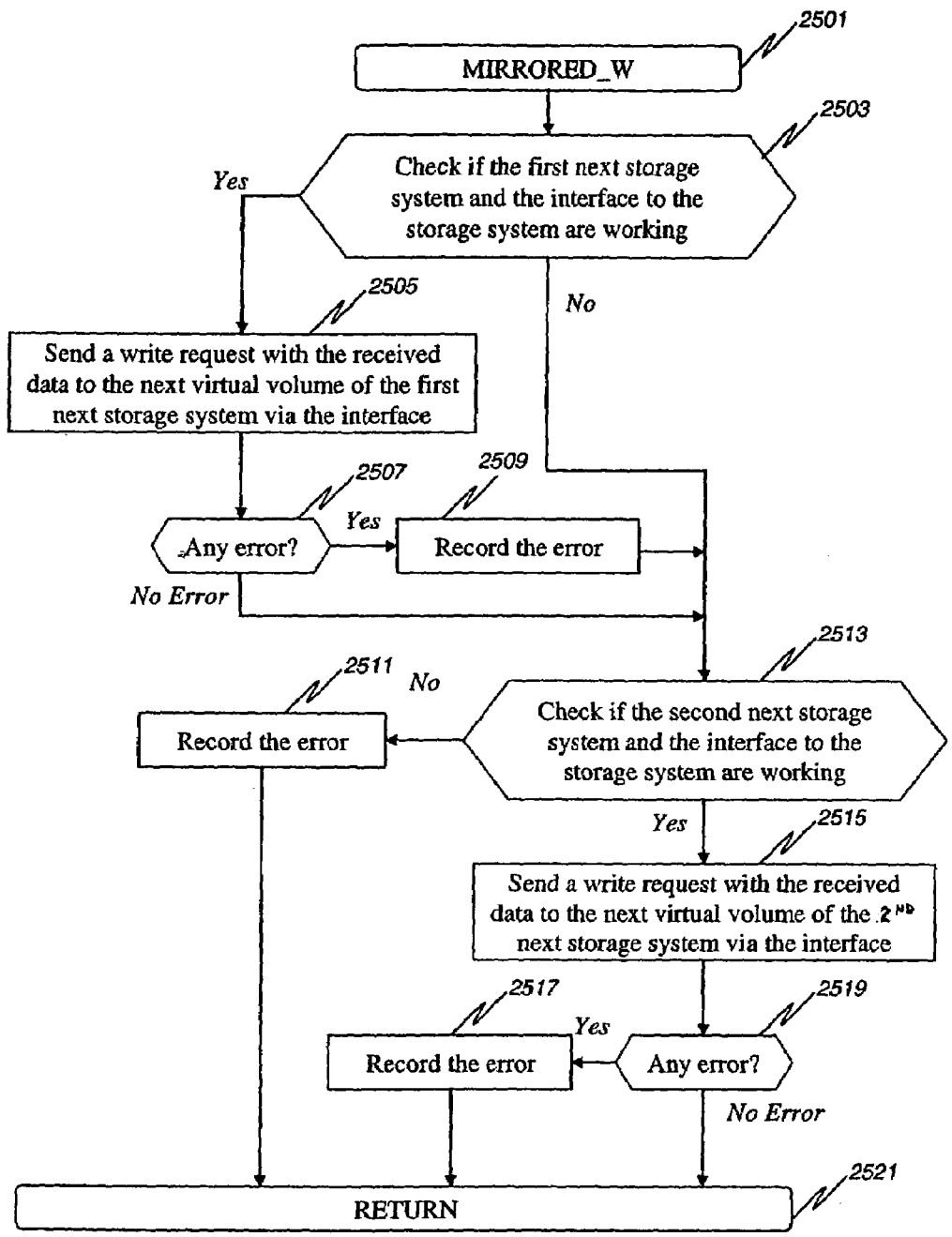
FIG. 10 is a flowchart of a mirrored write process according to an example embodiment of the present invention.

FIG. 10 shows a flowchart of a mirrored write process according to an example embodiment of the present invention. Once the mirrored write process begins, 2501, the disk controller checks if the primary next storage and the external interface to the primary next storage system are working, 2503. If they are working, the disk controller creates a write request and sends it to the next storage system via the external interface, 2505. If there were any errors detected during the sending of the write request, 2507, the disk controller records the errors into its memory and the failure management table, 2509, and proceeds to step 2513. If there were no errors detected during the sending of the write request, 2505, the disk controller may also go to step 2513, where the disk controller checks if a second next storage system and the interface to the second next storage system are working. If they are not working, the disk controller may record the errors into its memory, 2511, and exit this process, 2521. Thus, the data write has completely failed.

If the second next storage system and the interface to the second next storage system are working, the disk controller may create a write request and send it to the second next storage system via the external interface, 2515. If there were any errors detected during the sending of the write request, 2519, the disk controller records the errors into its memory and the failure management table, 2517, and then exits this process, 2521. If the data write to the primary storage system also failed, the data write process completely failed. If a data write to the primary storage system was successful, then the data write process was partially successful. In this case, the disk controller may not send an error response to the requestor in the disk controller main routine. The disk controller may send the error in the secondary storage system only to a management server. If there were no errors during the sending of a write request to the second next storage system, 2515, the data write was successful and the disk controller exits this process, 2521. If data write to the primary storage system failed, then the data write was partially successful. In this case the disk controller may not send an error response to the requestor in the disk controller main routine, but may send the error in the primary storage system only to a management server. If the data write to the primary storage system was successful, and the data write to the second next storage system was successful, the disk controller may send a success message to the requestor.

Figure 11:
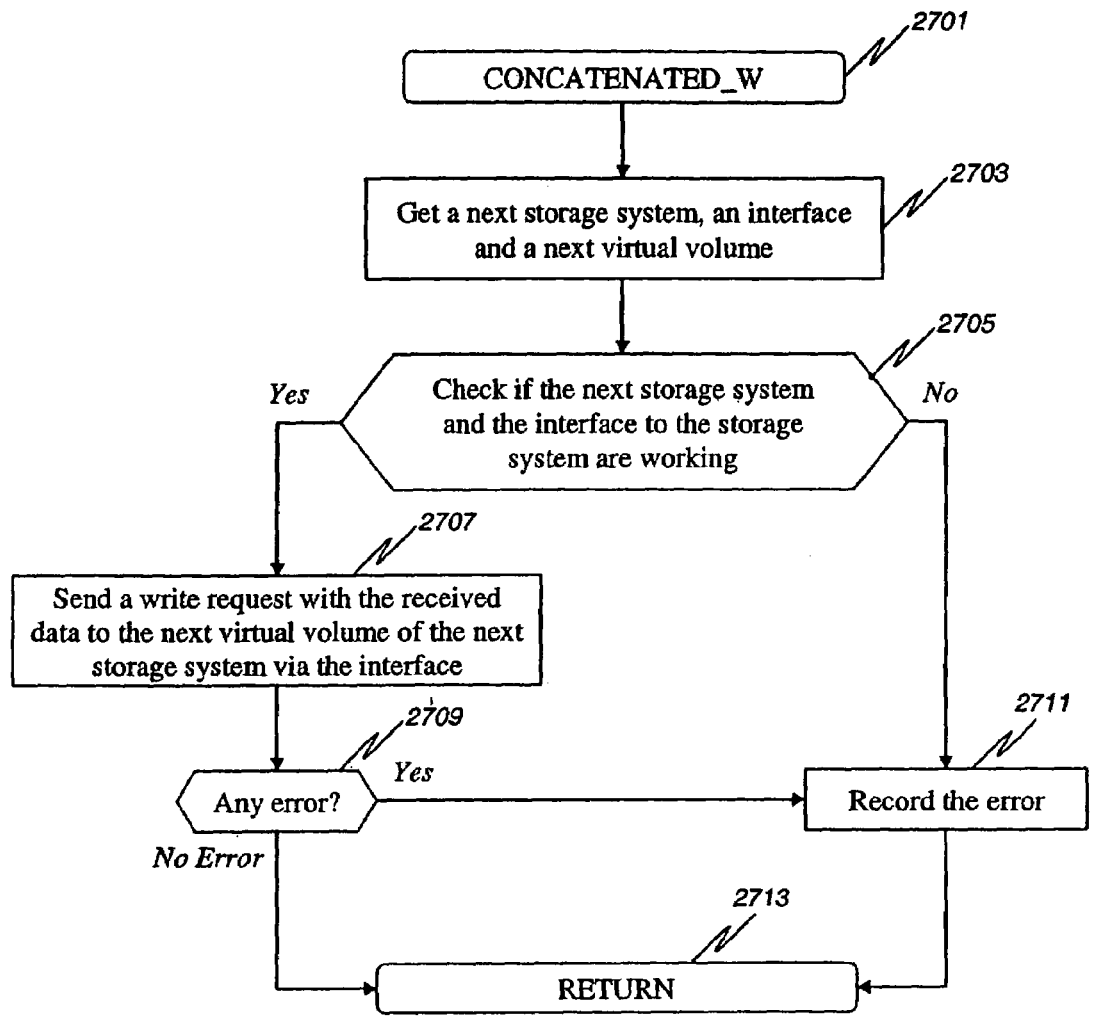
FIG. 11 is a flowchart of a concatenated write process according to an example embodiment of the present invention.

FIG. 11 shows a flowchart of a concatenated write process according to an example embodiment of the present invention. Once the concatenated write process begins, 2701, a disk controller determines which region data is going to be written. The disk controller then determines which next virtual volume the disk controller needs to transfer the write request, 2703. The disk controller checks if the next storage and the external interface to the next storage system are working, 2705. If they are both working, the disk controller may create a write request and send it to the next storage system via the external interface, 2707. If there were any errors detected during the sending of the write request, 2709, the disk controller may record the error into its memory and the failure management table, 2711, and exit this process, 2713. If there were no errors detected during the sending of the write request, 2707, the disk controller exits this process, 2713. If the next storage system or the interface to the next storage system are-not working, 2705, the disk controller may record the error into its memory and the failure management table, 2711, and exit this process, 2713.

Figure 12:
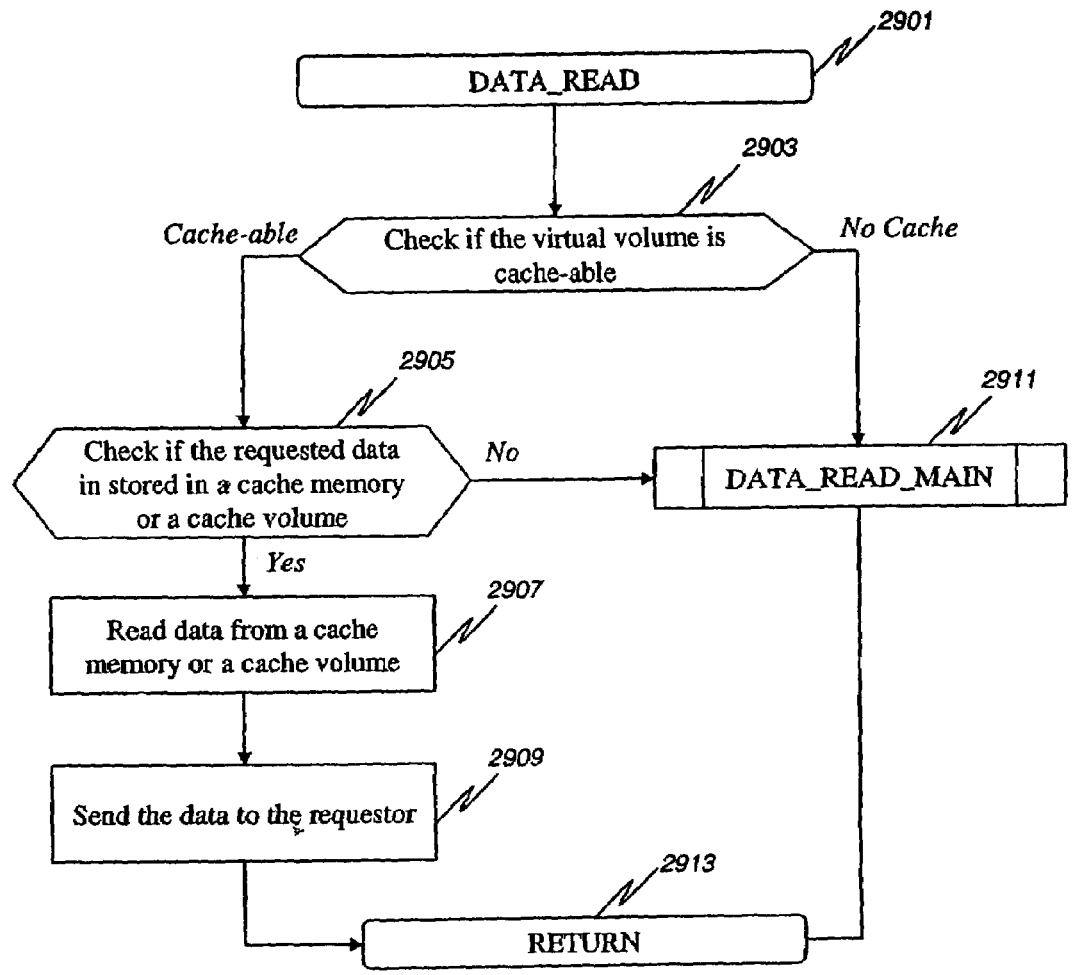
FIG. 12 is a flowchart of a data read process according to an example embodiment of the present invention.

FIG. 12 shows a flowchart of a data read process according to an example embodiment of the present invention. Once the data read process begins, 2901, a disk controller may check if a virtual volume specified in the received request is cache-able or not, 2903. If the virtual volume is cache-able, the disk controller may check if the requested data specified in the received request is being stored in a cache memory or a cache volume in the storage system, 2905. If the requested data is being cached, the disk controller may read the cache data from the cache memory or the cache volume, 2907, and send the data to the requestor, 2909, and the process ends, 2913. If the requested data is not stored in a cache memory or a cache volume, 2905, a data read main process may be executed, 2911, and the process ended, 2913.

Figure 13:
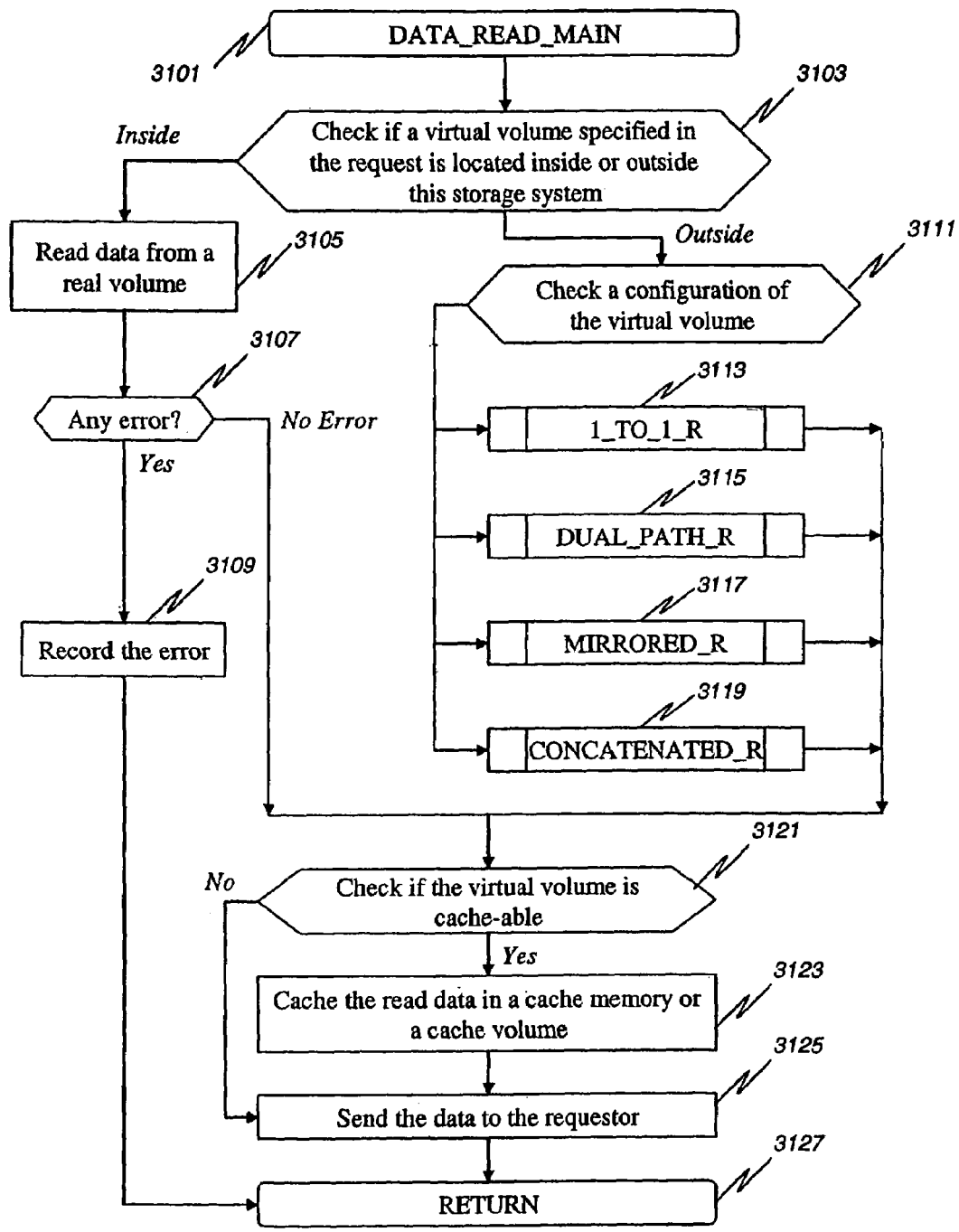
FIG. 13 is a flowchart of a data read main process according to an example embodiment of the present invention.

FIG. 13 shows a flowchart of a data read main process according to an example embodiment of the present invention. Once the data read main process begins, 3101, a disk controller checks if a virtual volume specified by the received request is mapped to a real volume inside the storage system or an external virtual volume outside the storage system, 3103. This may occur by using a virtual volume mapping table. If the virtual volume is mapped to a real volume inside the storage system, the disk controller reads a requested data from a real volume mapped to the virtual volume, 3105. If any errors have occurred during the read, 3107, the disk controller records the errors into its memory, 3109, and the process ends, 3127. If there were no errors during the read data, 3105, the process proceeds to step 3121. If the virtual volume specified in the request is located outside this storage system, the disk controller checks the mapping configuration or type of the virtual volume and the external volumes, 3111. The disk controller executes a corresponding process, one-to-one mapping, 3113, dual path mapping, 3115, mirrored mapping, 3117, concatenated mapping, 3119, etc. The disk controller then checks if the virtual volume is cache-able, 3121, and if it is, the disk controller stores the read data into its cache memory or its cache volume, 3123, and sends the data to the requestor, 3125, and the process ends, 3127. If the virtual volume is not cache-able, 3121, the disk controller sends the read data to the requester, 3125, and the process ends, 3127.

Figure 14:
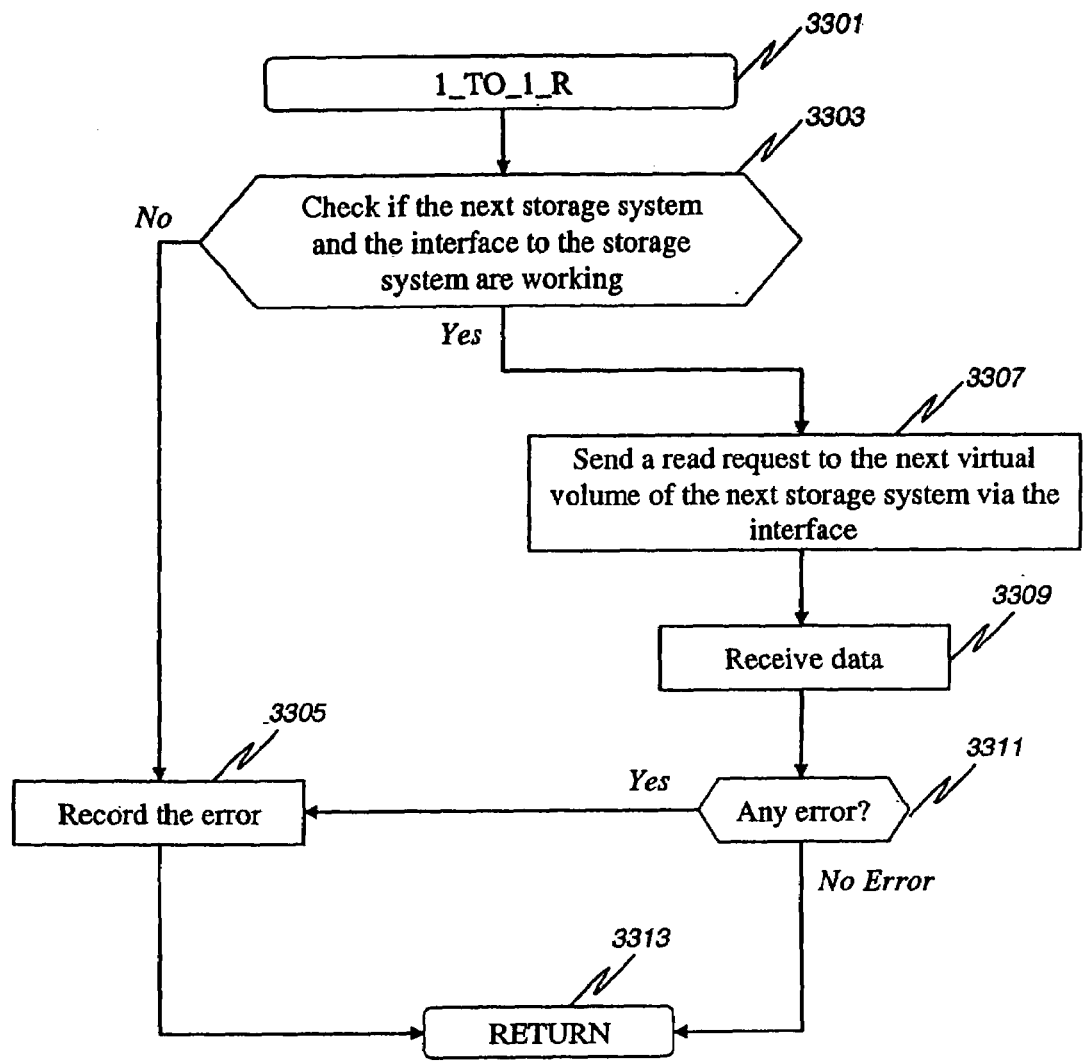
FIG. 14 is a flowchart of a one-to-one read process according to an example embodiment of the present invention.

FIG. 14 shows a flowchart of a one-to-one read process according to an example embodiment of the present invention. Once the one-to-one read process begins, 3301, a disk controller checks if the next storage system and the external interface from which the next storage system is accessed are working or not, 3303. If at least one of them is not working, the disk controller records the errors into its memory, 3305, and exits the process, 3313. If both the next storage system and the interface to the storage system are working, the disk controller may create a read request and send it to the next storage system via the external interface, 3307. The data is received, 3309, and if there are no errors during the sending or receiving of data, 3311, the process ends, 3313. If there are any errors during the sending or receiving of data, 3311, the disk controller records the errors into its memory and the failure management table, 3305, and the process ends, 3313.

Figure 15:
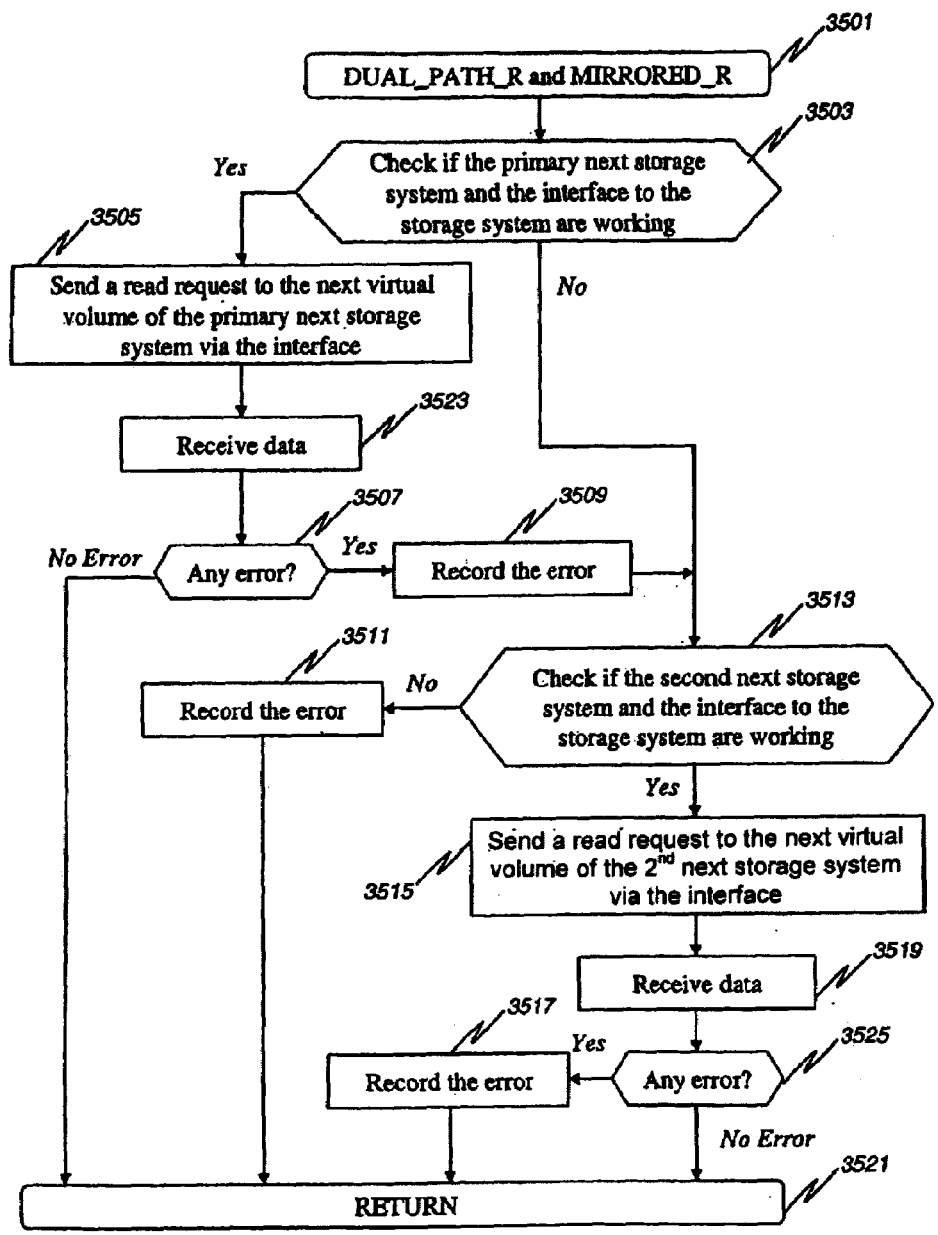
FIG. 15 is a flowchart for a dual path read process and a mirrored read process according to an example embodiment of the present invention.

FIG. 15 shows a flowchart for a dual path read process and a mirrored read process according to an example embodiment of the present invention. Once a dual path read or mirrored read process has begun, 3501, a disk controller may check if the primary next storage and the external interface to the primary next storage system are working, 3503. If they are working, the disk controller may create a read request and send it to the next storage system via the external interface, 3505. The disk controller receives data from the next storage system, 3523, and if there were any errors, 3507, the disk controller records the errors into its memory and the failure management table, 3509, and proceeds to step 3513. If there were no errors during the sending of the read request and receiving the data, the disk controller exits this process, 3521.

If either the primary next storage system or the interface to the storage system are not working, 3503, or any errors occurred during the sending a read request or receiving the data, 3505, 3523, 3507, the disk controller checks if the second next storage system and the interface to the second storage system are working, 3513. If they are not working, the disk controller may record the errors into its memory and the failure management table, 3511, and exit this process, 3521. If the second next storage system and the interface to the second next storage system are working, 3513, the disk controller may create a read request and send it to the second next storage system via the interface, 3515, and receive the data from the next storage system, 3519. If there were any errors detected during the sending of the read request or receiving the data, 3525, the disk controller may record the errors into its memory and the failure management table, 3517, and then exit this process, 3521. If no errors were detected, the data read was successful and the disk controller may exit this process, 3521. If data read from the primary storage system failed, the disk controller may not send any error message to the requestor, but may send the error only to a management server.

Figure 16:
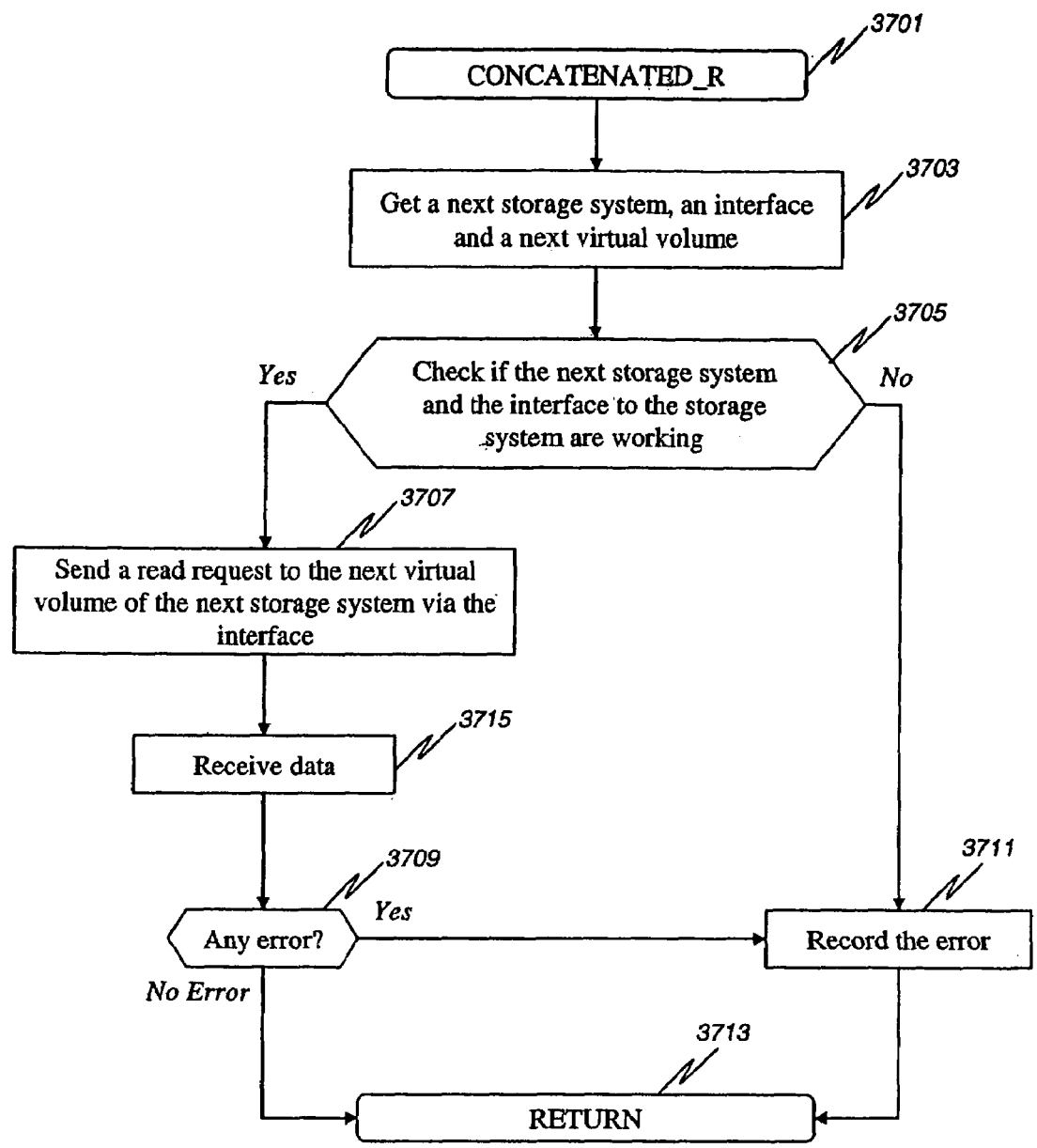
FIG. 16 is a flowchart of a concatenated read process according to an example embodiment of the present invention.

FIG. 16 shows a flowchart of a concatenated read process according to an example embodiment of the present invention. Once the concatenated read process begins, 3701, a disk controller may determine from which region data is going to be read. Then the disk controller may determine which next virtual volume the disk controller needs to transfer the request, 3703. The disk controller checks if the next storage and the external interface to the next storage system are working, 3705, and if they are working, the disk controller may create a read request and send it to the next storage system via the external interface, 3707, receive the data from the next storage system, 3715, and if no errors, exit the process, 3713. If there were any errors during the sending of the read request or receiving of the data, 3709, the disk controller may record the errors into its memory and the failure management table, 3711, and exit the process, 3713. Further, if either the next storage system or the interface to the next storage system is not working, 3705, the disk controller may record the errors into its memory in the failure management table, 3711, and exit the process, 3713.

Figure 17:
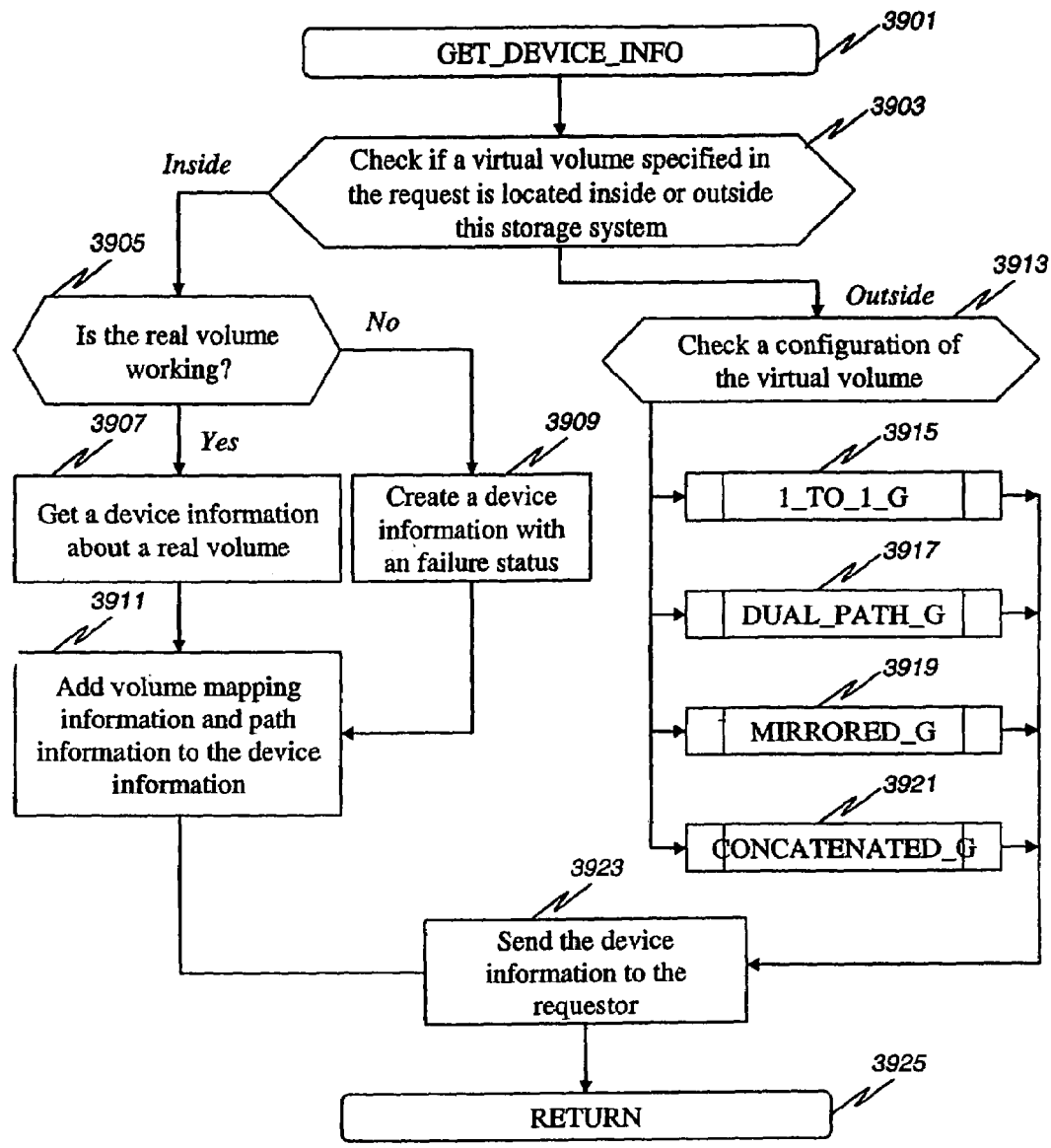
FIG. 17 is a flowchart of a get device info process according to an example embodiment of the present invention.

FIG. 17 shows a flowchart of a get device info process according to an example embodiment of the present invention. Once the get device info process begins, 3901, a disk controller may check if a virtual volume specified in the received request is mapped to a real volume inside the storage system or an external virtual volume outside the storage system, 3903. This may occur by using a virtual volume mapping table. If the virtual volume is mapped to a real volume inside the storage system, the disk controller may check if the real volume is working, 3905, and if it is working, the disk controller gets device information about the real volume, 3907, adds volume mapping information and path information to the device information, 3911, and sends the device information to the requestor, 3923, and the process ends, 3925.

If the real volume is not working, 3905, the disk controller may create a device information with a failure status, 3909, add volume mapping information and path information to the device information, 3911, send the device information to the requestor, 3923, and the process ends, 3925. If the virtual volume specified in the request is located outside this storage system, 3903, the disk controller may check a mapping type or configuration of the virtual volume and the external virtual volumes, 3913, and execute a corresponding process or subroutine, for example, one-to-one mapping process, 3915, a dual path mapping process, 3917, a mirrored mapping process, 3919, or a concatenated mapping process, 3921. At the conclusion of the configuration processes, the controller may send the device information to the requester, 3923, and the process ends, 3925.

Figure 18:
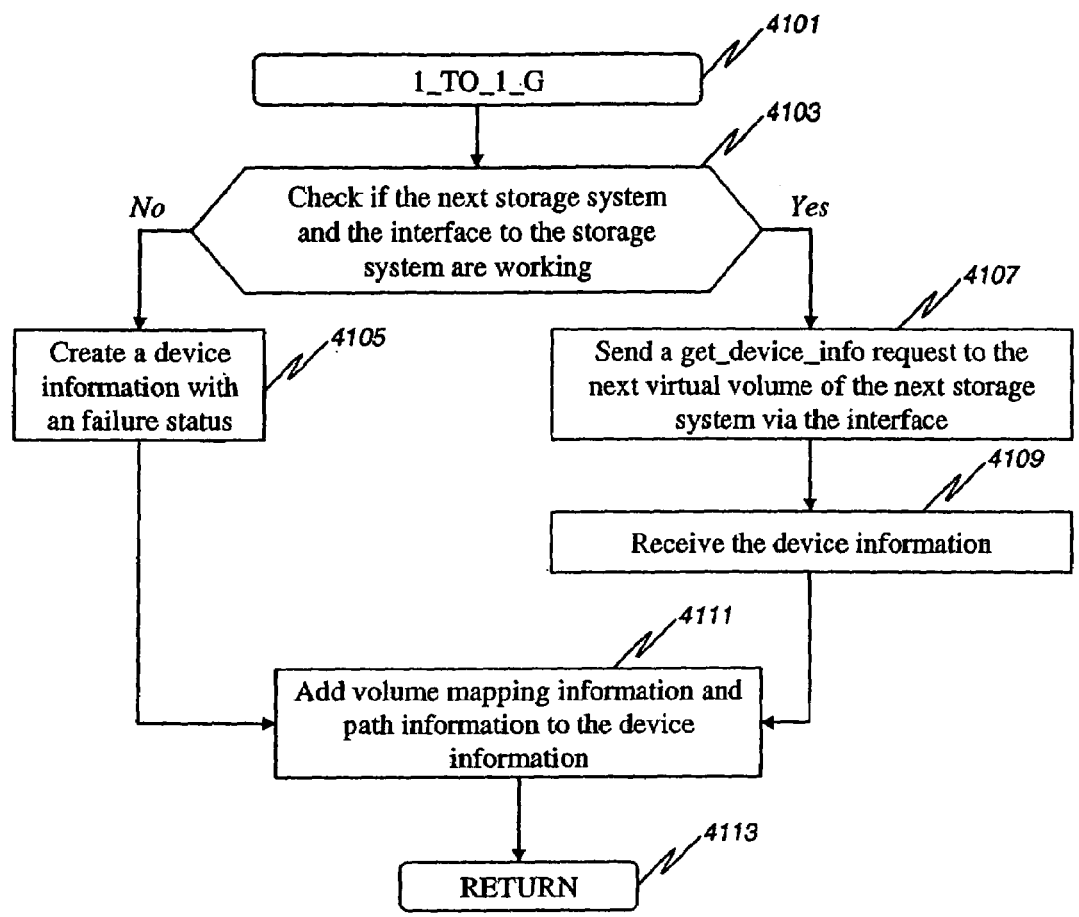
FIG. 18 is a flowchart of a one-to-one get info process according to an example embodiment of the present invention.

FIG. 18 shows a flowchart of a one-to-one get info process according to an example embodiment of the present invention. Once the one-to-one get info process begins, 4101, a disk controller may check if the next storage system and the external interface from which the next storage system is accessed, are working or not, 4103. If at least one of them is not working, the disk controller may create device information-with a failure status, 4105, add volume mapping information and path information to the device information, 4111, and the process ends, 4113. If the next storage system and the interface to the storage system are working, the disk controller may create a get device info request for the next virtual volume and send it to the next storage system via the external interface, 4107. The disk controller receives the device information sent from the next storage system, 4109 and may add volume mapping information and path information to the device information, 4111, and the process ends, 4113.

Figure 19:
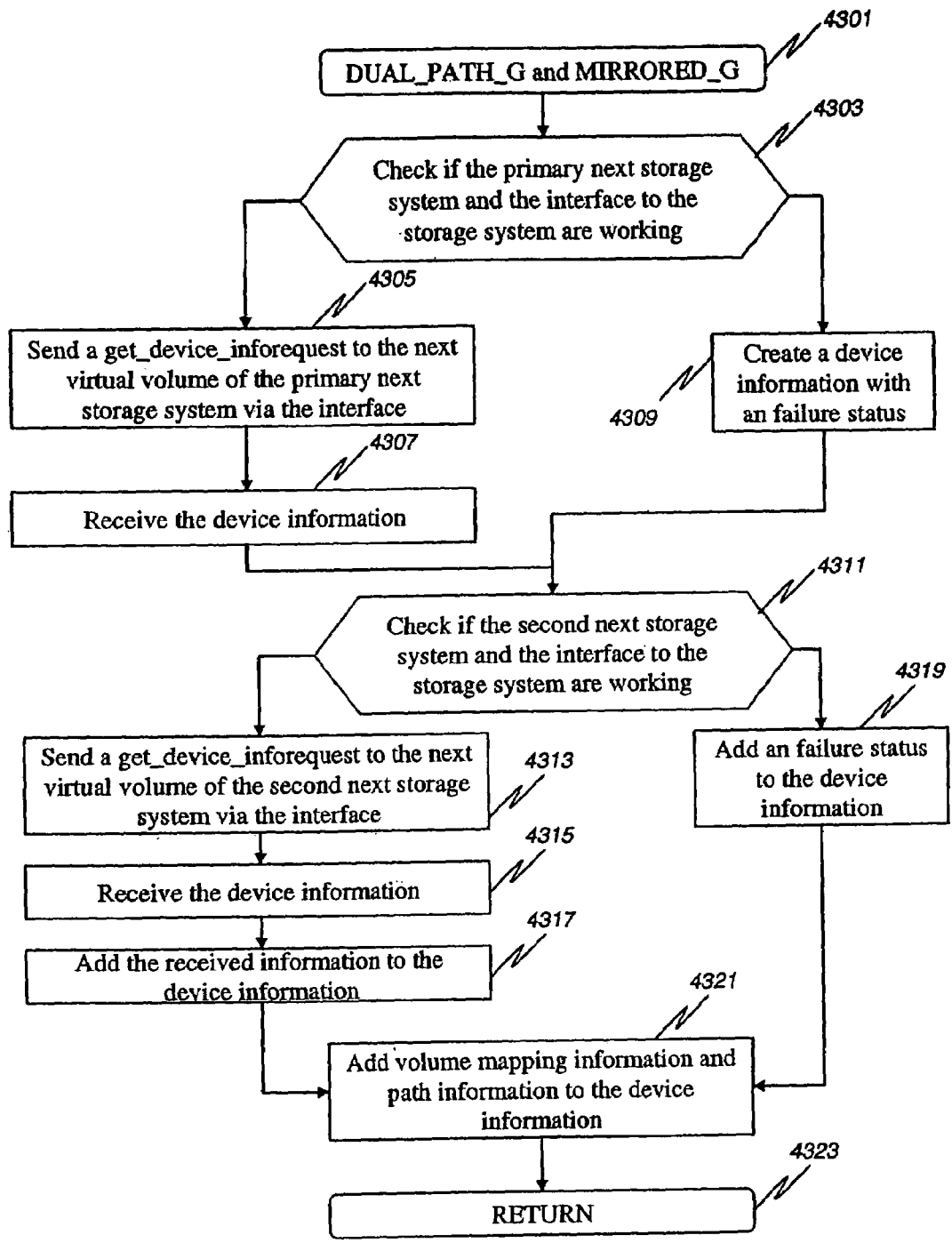
FIG. 19 is a flowchart of a dual path get information and a mirrored get information process according to an example embodiment of the present invention.

FIG. 19 shows a flowchart of a dual path get information and a mirrored get information process according to an example embodiment of the present invention. Once the dual path get information or mirror get information process begins, 4301, a disk controller may check if the primary next storage and the interface to the primary next storage system are working, 4303. If they both are working, the disk controller may create a get device info request for the next virtual volume in the primary next storage system and send it to the primary next storage system via the external interface, 4305. The disk controller may receive the device information sent from the primary next storage system, 4307, and then proceed to step 4311. If at least one of the primary next storage system or the interface is not working, the disk controller may create device information with failure status, 4309, and then go to step 4311. The disk controller checks if the secondary next storage and the external interface to the secondary next storage system are working, 4311. This example embodiment only includes one primary next storage system and one secondary next storage system in a dual path mapping configuration and mirrored mapping configuration, however, the present invention is not limited to this embodiment. If there were two or more secondary next storage systems, the disk controller merely repeats steps 4311–4321 for each secondary next storage system.

If the second next storage system and the interface are both working, the disk controller may create a get device info request for the next virtual volume in the secondary next storage system and send it to the secondary next storage system via the external interface, 4313. The disk controller receives the device information sent from the secondary next storage system, 4315, and adds the device information received from the secondary next storage system to the device information received from the primary next storage system, 4317. If at least one of the second next storage system or the interface is not working, the disk controller may add failure information to the device information received from the secondary next storage system, 4319, add volume mapping information and path information to the device information, 4321, and exit the process, 4323.

Figure 20:
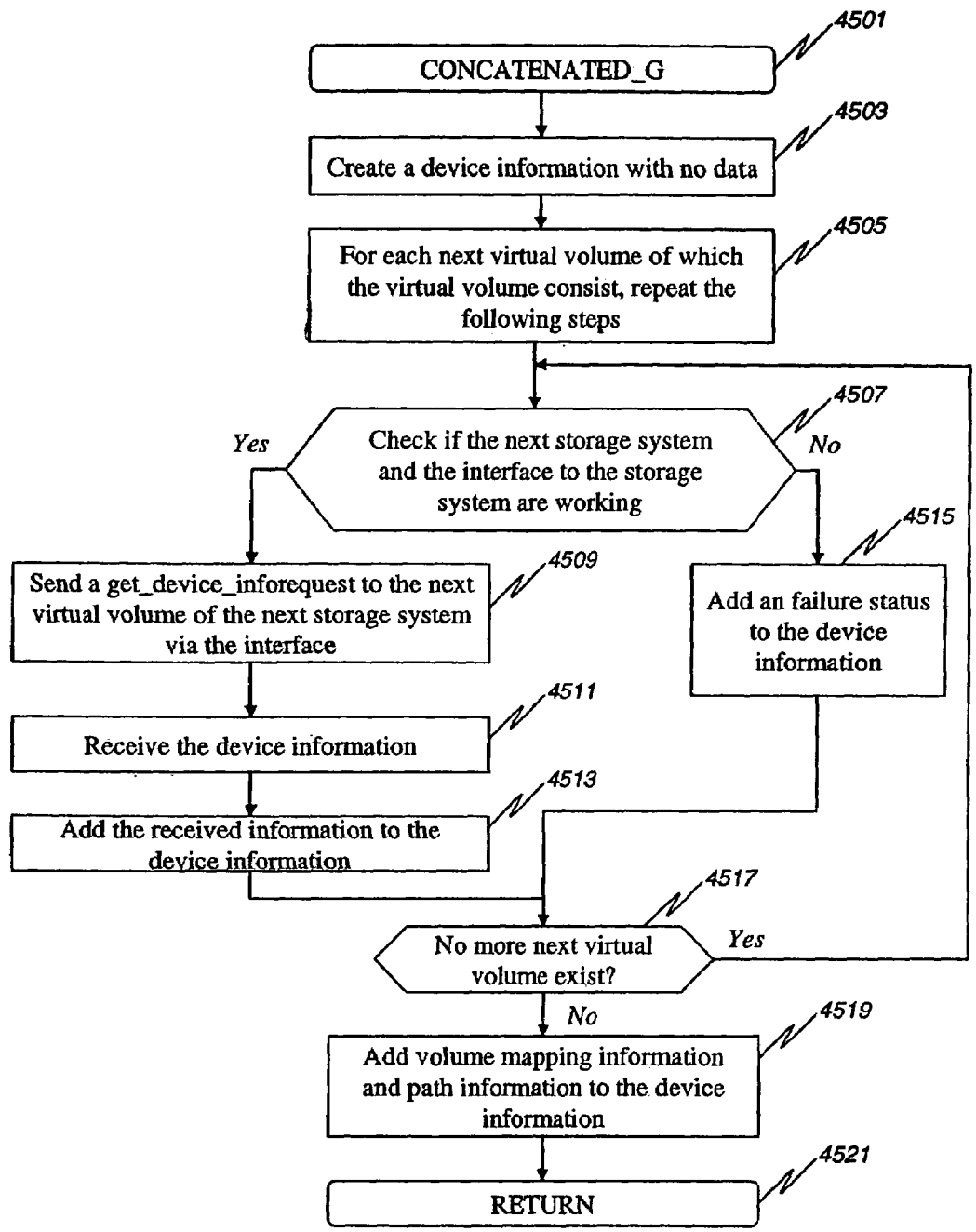
FIG. 20 is a flowchart of a concatenated get information process according to an example embodiment of the present invention.

FIG. 20 shows a flowchart of a concatenated get information process according to an example embodiment of the present invention. After a concatenated get information process has begun, 4501, a disk controller may create original device information without any data in it, 4503. For each next virtual volume of which the virtual volume consists, the disk controller may repeat the following steps 4507–4517, 4505. The disk controller may check if the next storage and the external interface to the next storage system are working, 4507. If they are both working, the disk controller may create get device info request for the next virtual volume in the next storage system and send it to the next storage system via the interface, 4509. The disk controller then receives the device information sent from the next storage system, 4511, the disk controller may then add the device information received from the next storage system to the original device information, 4513. If at least one of the next storage system or the interface is not working, the disk controller adds failure information to the original device information, 4515. Steps 4507–4515 may be repeated until there are no more next virtual volumes, 4517. If there are no more next virtual volumes, the disk controller may add volume mapping information and path information to the original device information, 4519, and the process ends, 4521.

Figures 21, 22:
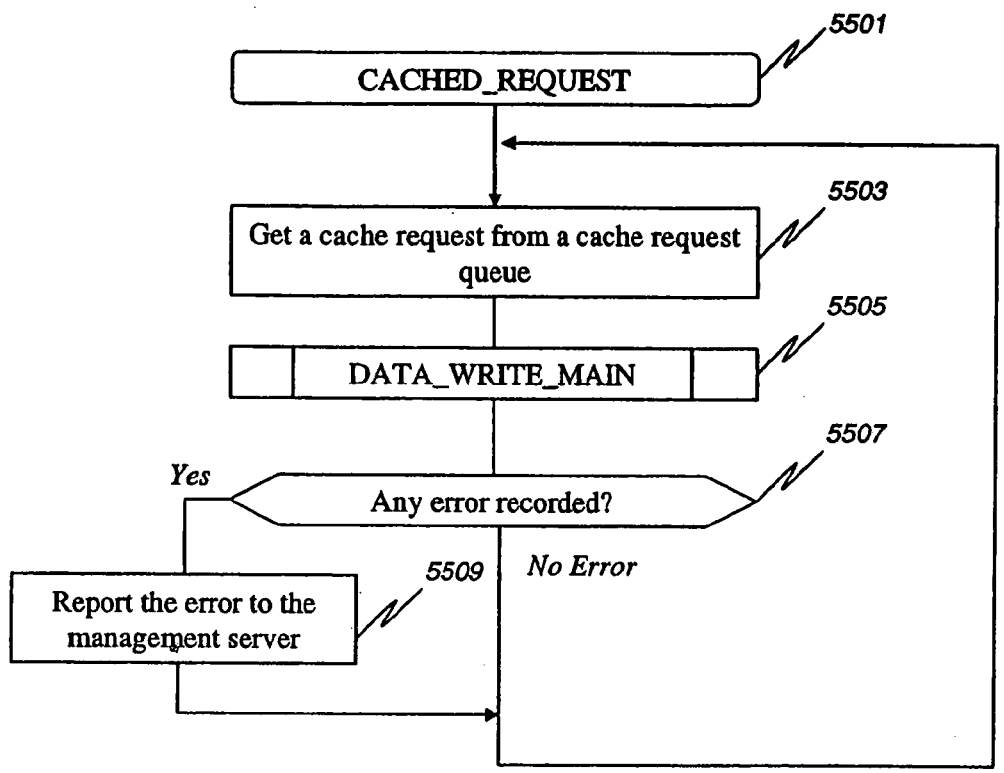
FIG. 21 is a flowchart of a cache request process according to an example embodiment of the present invention.
FIG. 22 is a diagram of a failure management table according to an example embodiment of the present invention.

FIG. 21 shows a flowchart of a cache request process according to an example embodiment of the present invention. Once a cache request process has begun, 5501, a disk controller may process the disk controller main routine and the cache request processing routine in parallel. One process may run on the disk controller processing the disk controller main routine and another process processes the cache request processing routine. Since there may be updated data in a cache memory or a cache volume and the data may not have yet been written to real volumes, this routine allows a disk controller to write the data to the real volumes. The disk controller gets a cache request from a cache request queue, 5503. The disk controller executes a data write main process for the cache request, 5505. If there were any errors during the data write main routine, the disk controller sends an error message to a management server, 5509. The process repeats until the cache has no more updated data.

FIG. 22 shows a diagram of a failure management table according to an example embodiment of the present invention. Each disk controller may have a failure management table, 1101. The "components" column, 110101, may show components that are related to a storage system. It may include external storage systems connected from this storage system, external interfaces that are used to connect to the external storage systems. An "availability" column, 110103, may show whether a component is working or not. As can be shown in this example embodiment, all components are available and working except for storage system D (SS_D) and External Interface 1.

Figures 23, 24:
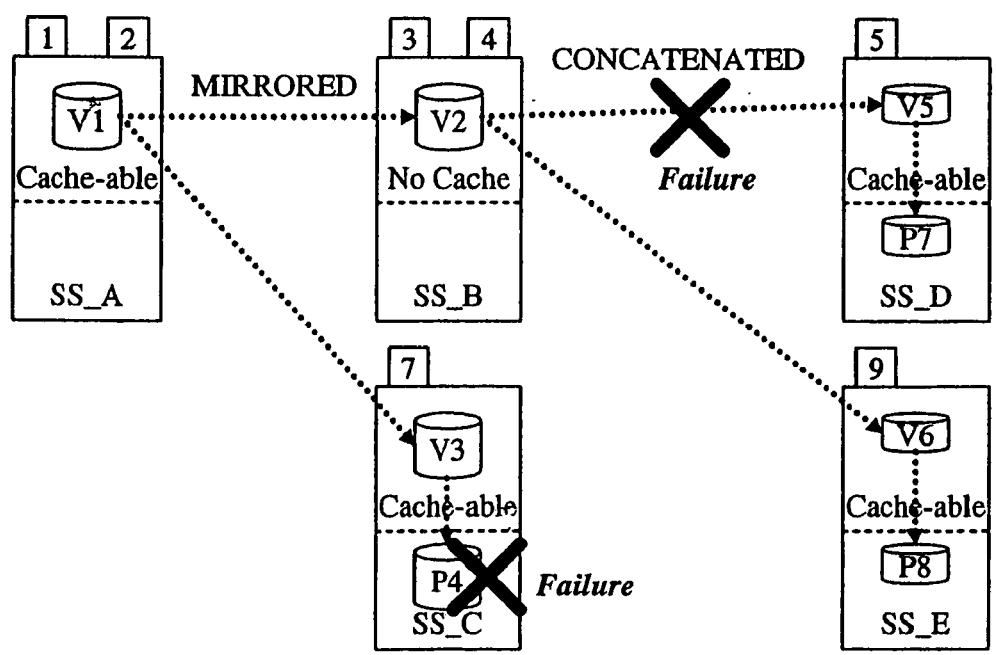
FIG. 23 is a diagram of an access control table according to an example embodiment of the present invention.
FIG. 24 is a diagram of a system configuration with failures according to an example embodiment of the present invention.

FIG. 23 shows a diagram of an access control table according to an example embodiment of the present invention. For each virtual volume, which server can access to the virtual volume, may be specified. This information may be shown in an access control table where a first column, 530101, shows the storage system and the second column, 530103, specifies an associated virtual volume, the third column, 530105, may show which servers have access to this virtual volume.

FIG. 24 shows a diagram of a system configuration with failures according to an example embodiment of the present invention. In this system, a server (not shown) issues a get device info request for virtual volume 1 (V1) in storage system A. Virtual volume 1 in storage system A (SS_A) is mapped to virtual volume 2 (V2) in storage system B (SS_B) and virtual volume 3 (V3) in storage system C (SS_C) with mirrored mapping. Virtual volume 2 in storage system B is mapped to virtual volume 5 (V5) in storage system D (SS_D) and virtual volume 6 (V6) in storage system E (SS_E) with concatenated mapping. However, the link between storage system B and storage system D is disconnected, so the storage system B cannot access storage system D. Virtual volume 3 in storage system C is mapped to a real volume P4 in storage system C. However, the real volume P4 has failed. Virtual volume 6 in storage system E is mapped to a real volume P8 in storage system E. A result of a get info request to this example system will be shown in FIG. 25.

FIGS. 25A–C show example results of a get device info request according to an example embodiment of the present invention. This figure reflects example information received as a result of a get device information request sent to the system shown in FIG. 24. The result shows how virtual volume 1 is configured, how I/O request to virtual volume 1 is transferred to real volumes, and status of virtual volumes, external interface, storage systems and real volumes. The result of the get device info request provides information regarding virtual volume 1, virtual volume 2, virtual volume 3, virtual volume 5, virtual volume 6, physical volume or real volume 4, and physical or real volume 8.

Figure 26:
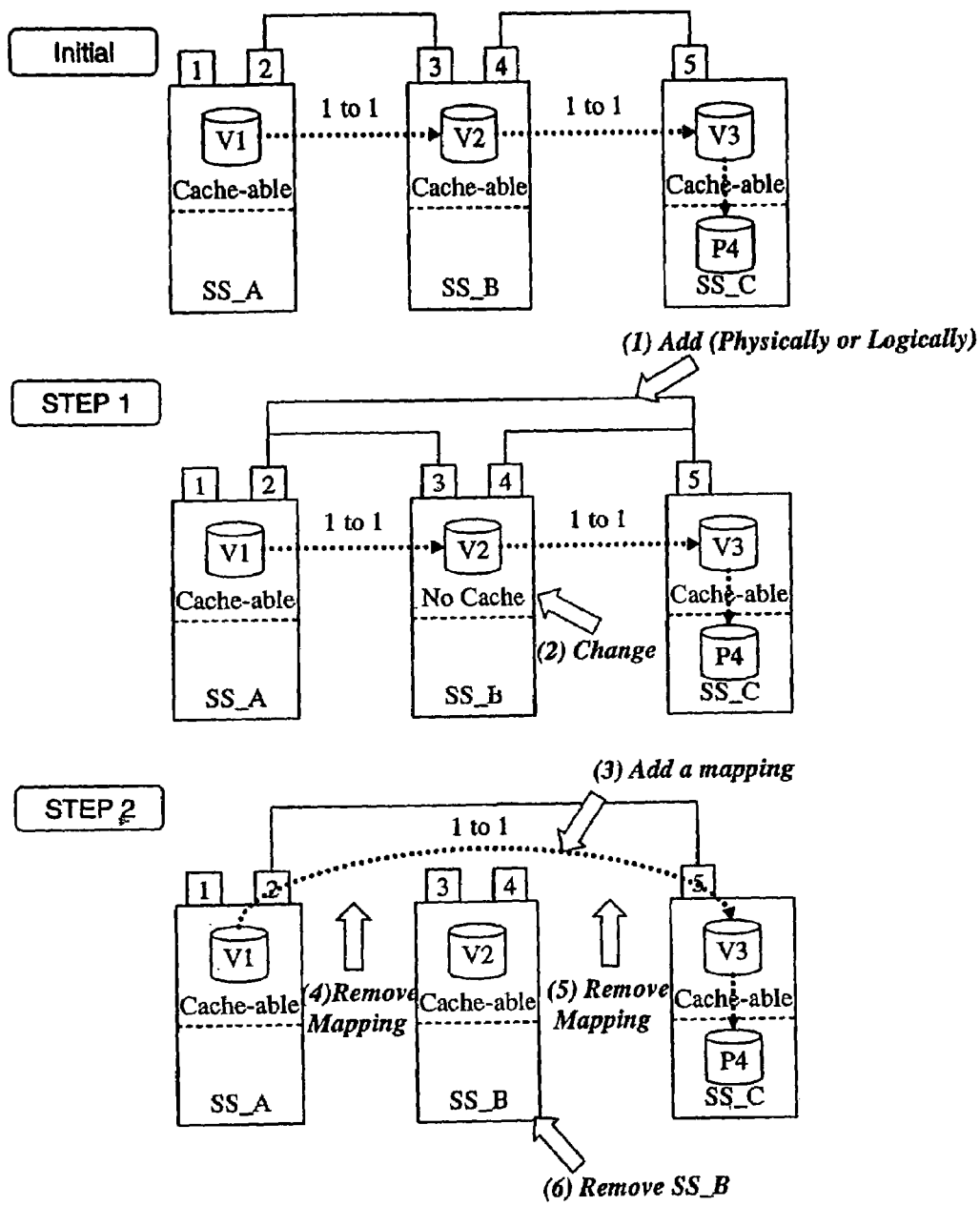
FIG. 26 is a diagram illustrating removal of a storage system according to an example embodiment of the present invention.

FIG. 26 shows a diagram illustrating removal of a storage system according to an example embodiment of the present invention. This diagram is an example illustration of how to remove an intermediate storage system from a volume hierarchy. An I/O request may be transferred by multiple intermediate storage systems. When a user wants to remove one or more intermediate storage systems, the steps illustrated are performed. In this example embodiment, storage system A, storage system B and storage system C are cascaded. Storage system B is to be removed from the cascade. In step 1, storage system A and storage system B are connected directly and a cache mode of virtual volume 2 is changed from cache-able to no cache. Therefore, any data write request from storage system A to virtual volume 2 may be transferred to virtual volume 4 of storage system C. The connection between storage system A and storage system C may be a physical connection and/or a logical connection. In the case of a logical connection, the storage system A and the storage system C may have been previously connected via physical cables or networks before the removing process. Storage system A and storage system C can communicate with each other by connecting to each other logically, in this case, storage system B can be removed online without stopping any I/Os from virtual volume 1. In step 2, a mapping configuration of virtual volume 1 of storage system A is changed. Virtual volume 1 is mapped not only to virtual volume 2 of storage system B, but also to virtual volume 3 of storage system C with dual path mapping. Then, the mapping relationships between virtual volume 1 and virtual volume 2, and virtual volume 2 and virtual volume 3 are removed. After this, storage system B can be removed from the system.

In a dual path mapping configuration, it is possible to load balance I/Os among multiple routes. A disk controller that has a virtual volume with dual path configuration may count the number of I/Os being processed by a child storage system for each path. Based on the number of I/Os, the disk controller may decide to which path the disk controller transfers the received I/O.

In processing a get device info request, network latency information between storage systems may be added into the device information. Parent storage systems measure how long it takes to get a response for get device info requests from a next storage system.

Embodiments according to the present invention are advantageous in that a server can read and write data in a storage system although the server is not connected to the storage system because a route between the server and the storage system is provided by passing intermediate storage systems. Moreover, device information is continually updated and may be obtained by a server therefore providing information on the current status as to components in a system as well as the interfaces between the components.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for linking external storage systems comprising:
    creating a virtual volume mapping at one or more storage systems, each virtual volume mapping at each storage system associating a virtual storage volume with at least one of a physical storage volume and at least one second virtual storage volume at least one second storage system;
receiving an access request at a first storage system specifying a virtual volume,
    determining on which storage system a physical storage volume associated with the specified virtual volume in the access request is located using at least one of the virtual volume mapping at the first storage system and virtual volume mapping at one or more second storage systems; and
    providing access to said physical storage volume based on which storage system the physical storage volume is located;
wherein the access request comprises a data write request; further comprising checking if the virtual volume has an associated cache,
    determining if the specified virtual volume in the access request is mapped to a physical storage volume at the first storage system or a second virtual storage volume at least one second storage system, if no cache exists,
    writing write data associated with the access request into the physical storage volume at the first storage system if the specified virtual volume in the access request is mapped to a physical storage volume at the first storage system; and
    determining if an error was detected during the writing the write data associated with the access request into the physical storage volume at the first storage system, and recording the error if detected.

2. The method according to claim 1, further comprising determining a mapping type of the specified virtual volume in the access request, if the specified virtual volume in the access request is mapped to a second virtual storage volume at least one second storage system.

3. The method according to claim 2, further comprising determining that the mapping type is a 1 to 1 type and performing the following:
    determining if the at least one second storage system and an interface to the at least one second storage system are operational; sending write data associated with the access request to the second virtual storage volume at least one second storage system via the interface, if the at least one second storage system and the interface are operational; and
    recording an error if the at least one second storage system or the interface are not operational or if an error is detected during the sending the write data associated with the access request to the second virtual storage volume at the at least one second storage system.

4. The method according to claim 2, further comprising determining that the mapping type is a dual path type and performing the following:
    determining if a primary storage system of the at least one second storage system and an interface to the primary storage system are operational;
    sending a write request with write data associated with the access request to a second virtual storage volume at the primary storage system via the interface, if the primary storage system of the at least one second storage system and the interface are operational;
    determining if a next storage system of the at least one second storage system and an interface to the next storage system are operational, if the primary storage system or the interface to the primary storage system are not operational;
    sending a write request with write data associated with the access request to a second virtual storage volume at the next storage system via the interface to the next storage system, if the next storage system of the at least one second storage system and the interface to the next storage system are operational and the primary storage system or the interface to the primary storage system are not operational; and
    recording an error if the primary storage system or the interface to the primary storage system are not operational, or if the next storage system or the interface to the next storage system are not operational, or if an error is detected during the sending the write request with write data associated with the access request.

5. The method according to claim 2, further comprising determining that the mapping type is a mirrored type and performing the following:
    determining if a first next storage system of the at least one second storage system and an interface to the first next storage system are operational;
    sending a write request with write data associated with the access request to a second virtual storage volume at the first next storage system via the interface to the first next storage system, if the first next storage system of the at least one second storage system and the interface to the first next storage system are operational;
    determining if a second next storage system of the at least one second storage system and an interface to the second next storage system are operational, if the first next storage system or the interface to the first next storage system are not operational;
    sending a write request with write data associated with the access request to a second virtual storage volume at the second next storage system via the interface to the second next storage system, if the second next storage system of the at least one second storage system and the interface to the second next storage system are operational and the first next storage system or the interface to the first next storage system are not operational; and
    recording an error if the first next storage system or the interface to the first next storage system are not operational, or if the second next storage system or the interface to the second next storage system are not operational, or if an error is detected during the sending the write request with write data associated with the access request.

6. The method according to claim 2, further comprising determining that the mapping type is a concatenated type and performing the following:

determining if the at least one second storage system and an interface to the at least one second storage system are operational;

sending write data associated with the access request to the second virtual storage volume at least one second storage system via the interface, if the at least one second storage system and the interface are operational; and recording an error if the at least one second storage system or the interface are not operational or if an error is detected during the sending the write data associated with the access request to the second virtual storage volume at the at least one second storage system.

7. A method for linking external storage systems comprising:

creating a virtual volume mapping at one or more storage systems, each virtual volume mapping at each storage system associating a virtual storage volume with at least one of a physical storage volume and at least one second virtual storage volume at least one second storage system;

receiving an access request at a first storage system specifying a virtual volume;

determining on which storage system a physical storage volume associated with the specified virtual volume in the access request is located using at least one of the virtual volume mapping at the first storage system and virtual volume mapping at one or more second storage systems; and providing access to said physical storage volume based on which storage system the physical storage volume is located;

wherein the access request comprises a data read request;

further comprising checking if the virtual volume has an associated cache;

determining if the specified virtual volume in the access request is mapped to a physical storage volume at the first storage system or a second virtual storage volume at least one second storage system, if no cache exists;

determining a configuration of the specified virtual volume in the access request, if the specified virtual volume in the access request is mapped to a second virtual storage volume at least one second storage system;

determining that the configuration is a 1 to 1 type and performing the following:

determining if the at least one second storage system and an interface to the at least one second storage system are operational;

sending a read request to the second virtual storage volume at least one second storage system via the interface, if the at least one second storage system and the interface are operational;

receiving read data associated with the read request; and recording an error if the at least one second storage system or the interface are not operational or if an error is detected during the sending the read request to the second virtual storage volume at the at least one second storage system or the receiving the read data associated with the read request.

8. The method according to claim 7, further comprising determining that the configuration is one of a dual path type and a mirrored type, and performing the following:

determining if a primary storage system of the at least one second storage system and an interface to the primary storage system are operational;

sending a read request to a second virtual storage volume at the primary storage system via the interface, if the primary storage system of the at least one second storage system and the interface are operational;

determining if a next storage system of the at least one second storage system and an interface to the next storage system are operational, if the primary storage system or the interface to the primary storage system are not operational;

sending a read request to a second virtual storage volume at the next storage system via the interface to the next storage system, if the next storage system of the at least one second storage system and the interface to the next storage system are operational and the primary storage system or the interface to the primary storage system are not operational;

receiving read data associated with the read request;

recording an error if the primary storage system or the interface to the primary storage system are not operational, or if the next storage system or the interface to the next storage system are not operational, or if an error is detected during the sending the write request with write data associated with the access request or the receiving the read data associated with the read request.

9. The method according to claim 7, further comprising determining that the configuration is a concatenated type and performing the following:

determining a one of the at least one second storage system from which read data is to be read;

determining if the one at least one second storage system and an interface to the one at least one second storage system are operational;

sending a read data request to the second virtual storage volume at the one least one second storage system via the interface, if the one at least one second storage system and the interface are operational; and recording an error if the one at least one second storage system or the interface are not operational or if an error is detected during the sending the read request to the second virtual storage volume at the at the one at least one second storage system.

10. A method for linking external storage systems comprising:

creating a virtual volume mapping at one or more storage systems, each virtual volume mapping at each storage system associating a virtual storage volume with at least one of a physical storage volume and at least one second virtual storage volume at least one second storage system;

receiving an access request at a first storage system specifying a virtual volume, determining on which storage system a physical storage volume associated with the specified virtual volume in the access request is located using at least one of the virtual volume mapping at the first storage system and virtual volume mapping at one or more second storage systems; and providing access to said physical storage volume based on which storage system the physical storage volume is located;

wherein the access request comprises a get device info request;

further comprising determining if the specified virtual volume in the access request is mapped to a physical storage volume at the first storage system or a second virtual storage volume at least one second storage system;

determining if the specified virtual volume in the access request is mapped to a physical storage volume at the first storage system or a second virtual storage volume at least one second storage system, determining that the configuration is a 1 to 1 type and performing the following:
  determining if the at least one second storage system and an interface to the at least one second storage system are operational;
  sending a get device info request to the second virtual storage volume at least one second storage system via the interface, if the at least one second storage system and the interface are operational;
  receiving device information associated with the get device info request; and
  sending the device information to an originator of the access request.

11. The method according to claim 10, further comprising, creating a device information comprising a failure status if the at least one second storage system or an interface to the at least one second storage system are not operational.

12. The method according to claim 10, wherein the device information comprises volume mapping information and path information.

13. A system for linking external storage systems comprising:
  at least one host device, said host device initiating access requests to access a virtual storage volume providing access to a physical storage volume;
  at least one storage system, each said storage system comprising a virtual volume mapping associating a virtual storage volume with at least one of a physical storage volume and at least one second virtual storage volume in at least one second storage system, and said storage system further comprising at least one of said virtual storage volume and said physical storage volume; and
  at least one switch, each said switch operatively connected to at least one host device via a first interface and at least one storage system via a second interface,
  wherein each said storage system being capable of receiving said access requests and determining on which storage system the physical storage volume is located using at least one of the virtual volume mapping at the first storage system and virtual volume mapping at one or more second storage systems, and providing access to said physical storage volume based on which storage system the physical storage volume is located; and
  the at least one storage system determining a configuration of the virtual storage volume in the access request, if the virtual storage volume in the access request is mapped to a second virtual storage volume at least one second storage system;
  wherein the configuration comprises one of a 1 to 1 configuration, a dual path configuration, a mirrored configuration, and a concatenated configuration.

* * * * *